United States Patent
Rajguru et al.

(10) Patent No.: US 12,471,883 B2
(45) Date of Patent: Nov. 18, 2025

(54) APPEARANCE CONTROL FOR MEDICAL IMAGES

(71) Applicant: KONINKLIJKE PHILIPS N.V., Eindhoven (NL)

(72) Inventors: Nikhil Sreedhar Rajguru, San Diego, CA (US); Vladimir Zagrodsky, El Dorado Hills, CA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 312 days.

(21) Appl. No.: 18/027,496

(22) PCT Filed: Sep. 15, 2021

(86) PCT No.: PCT/EP2021/075260
§ 371 (c)(1),
(2) Date: Mar. 21, 2023

(87) PCT Pub. No.: WO2022/063641
PCT Pub. Date: Mar. 31, 2022

(65) Prior Publication Data
US 2023/0371928 A1    Nov. 23, 2023

Related U.S. Application Data

(60) Provisional application No. 63/082,498, filed on Sep. 24, 2020.

(51) Int. Cl.
*A61B 8/00* (2006.01)
*A61B 8/08* (2006.01)
(Continued)

(52) U.S. Cl.
CPC ............ *A61B 8/467* (2013.01); *A61B 8/0891* (2013.01); *A61B 8/12* (2013.01); *A61B 8/465* (2013.01);
(Continued)

(58) Field of Classification Search
CPC ......... A61B 8/467; A61B 8/0891; A61B 8/12; A61B 8/465; G06T 7/0002; G06T 2207/10132
See application file for complete search history.

(56) References Cited

U.S. PATENT DOCUMENTS 7,846,101 B2    12/2010    Eberle
RE46,562 E  *  10/2017    Huennekens ........ A61B 34/20
(Continued)

FOREIGN PATENT DOCUMENTS

EP    3143939 A1    3/2017

OTHER PUBLICATIONS

International Search Report and Written Opinion of PCT/EP2021/075260, dated Dec. 20, 2021.

*Primary Examiner* — Baisakhi Roy

(57) ABSTRACT

According to one embodiment, an ultrasound imaging system is configured to receive images from an ultrasound imaging device, and output, to a display in communication with the processor circuit, a screen display including an image and a user control comprising a plurality of control positions. The system is further configured to receive a control input associated with a single selected position of the user control, and based on the single selected position, determine at least two altered image setting values associated with at least two image settings of the plurality of image settings. The system then generates an updated image using the at least two altered image setting values. Accordingly, a single, intuitive control can change multiple visual aspects of an ultrasound image, such changing the image from grayscale to color, and many contrast and/or brightness levels in between, in a single user action.

20 Claims, 16 Drawing Sheets

(51) Int. Cl.
*A61B 8/12* (2006.01)
*G06T 7/00* (2017.01)

(52) U.S. Cl.
CPC .. *G06T 7/0002* (2013.01); *G06T 2207/10132* (2013.01)

(56) References Cited

U.S. PATENT DOCUMENTS

| | | | |
|---|---|---|---|
| 10,292,676 B2 | 5/2019 | Rajguru | |
| 2006/0173326 A1* | 8/2006 | Thiele | G01S 15/8988 |
| | | | 600/440 |
| 2008/0259590 A1* | 10/2008 | De Goederen -Oei | |
| | | | H05B 47/175 |
| | | | 362/85 |
| 2012/0081386 A1* | 4/2012 | Wiemker | G06T 19/00 |
| | | | 345/611 |
| 2015/0133776 A1 | 5/2015 | Hoffman | |
| 2016/0354060 A1* | 12/2016 | Perrey | A61B 8/465 |
| 2017/0078706 A1* | 3/2017 | Van Der Vleuten | G06T 5/92 |
| 2017/0193658 A1* | 7/2017 | Cardinal | A61B 8/12 |
| 2019/0108637 A1* | 4/2019 | Su | G06T 11/60 |
| 2020/0129142 A1* | 4/2020 | Chao | A61B 8/0891 |
| 2020/0129143 A1* | 4/2020 | Di Tullio | A61B 8/085 |
| 2020/0129144 A1 | 4/2020 | Rajguru | |

* cited by examiner

1100

APPEARANCE CONTROL FOR MEDICAL IMAGES

TECHNICAL FIELD

The subject matter described herein relates to a system for medical imaging. In particular, the disclosed system provides controls for the display of ultrasound images. This system has particular but not exclusive utility for diagnosis and treatment of vascular diseases.

BACKGROUND

Different diseases or medical procedures produce physical features with different size, structure, density, water content, and accessibility for imaging sensors. For example, a deep-vein thrombosis (DVT) produces a clot of blood cells, whereas post-thrombotic syndrome (PTS) produces webbing or other residual structural effects in a vessel that have similar composition to the vessel wall itself, and may thus be difficult to distinguish from the vessel wall. A stent is a dense (e.g., metallic) object that may be placed in a vessel or lumen to hold the vessel or lumen open to a particular diameter. In some cases, intraluminal imaging is carried out with an IVUS device including one or more ultrasound transducers. The IVUS device may be passed into the vessel and guided to the area to be imaged. The transducers emit ultrasonic energy and receive ultrasound echoes reflected from the vessel. The ultrasound echoes are processed to create an image of the vessel of interest. The image of the vessel of interest may include one or more lesions or blockages in the vessel. A stent may be placed within the vessel to treat these blockages and intraluminal imaging may be carried out to view the placement of the stent within the vessel.

During a catheterization procedure, a physician aims to identify and measure anatomical structures in blood vessels (coronary or peripheral) in order to select and plan a specific treatment, such as a stent placement, and to verify results of the intervention, such as the accuracy of the stent deployment. IVUS image quality and image interpretation are two of the biggest hurdles in effective use of IVUS imaging. Ultrasound images tend to be grainy and noisy. Image quality is very subjective, and because imaging needs differ from procedure to procedure and user to user, it is difficult to optimize image settings at the source for a one-size-fits-all solution.

Grayscale images offer limited dynamic range for image interpretation. The appearance of IVUS images may be adjusted, either during a catheterization procedure or during post-procedure review, by adjusting image settings such as brightness, contrast, or gain curve. In some instances, multiple setting values may be selected simultaneously through the use of an image preset. Image presets may, for example, optimize image appearance for specific applications such as venous, arterial, or coronary imaging, stent deployment, or otherwise. A system that provides IVUS grayscale displays typically offers some image controls that allow the user only a limited flexibility in changing dynamic range and image appearance on display. Color allows more controls for image visualization because it operates on several component channels that can be optimized independently, thus giving users more flexibility. Besides the basic red, green and blue components, color parameters such as hue, saturation and luminance can be used to change the appearance of an image, changing the visibility or clarity of different features. Unfortunately, each user control added to the system increases the complexity, learning curve, and "search space" for optimal image appearance.

The information included in this Background section of the specification, including any references cited herein and any description or discussion thereof, is included for technical reference purposes only and is not to be regarded as subject matter by which the scope of the disclosure is to be bound.

SUMMARY

The present disclosure relates generally to medical imaging, including imaging associated with a body lumen of a patient using an intraluminal imaging device. Disclosed is a system for conveniently adjusting multiple image appearance inputs with a single control.

The image appearance control provides seamless integration of multiple color and/or grayscale image adjustments into a simple, intuitive control. This enables real-time interpretation of IVUS images during a catheterization procedure, rather than only in a post-procedure review session. Quick and reliable identification of clinically significant anatomical structures may be difficult in IVUS images. IVUS clinicians need flexibility in image manipulation. However, to avoid overwhelming the user, it is desirable that the display controls are simple and intuitive while still offering flexibility. Image colorization allows the system to enhance the visual appearance of image elements that might be difficult to discern with a traditional grayscale control. The image appearance control merges multiple different display controls, such as grayscale and colorization, into a single user interface component. This simplified interface allows IVUS clinicians to choose their preference among a broad range of visualization configurations with a single click action. An example "appearance" control may for example comprise a primary grayscale sector and a secondary colorization sector. Both the primary and secondary sectors may be merged into a single control that seamlessly transitions between all available visualization settings. Thus, a single, intuitive control can change IVUS image appearance from grayscale to color, and many contrast levels in between, in a single user action. In other aspects, the control of several different display attributes can be integrated into one or more user interface control objects, such as sliders, buttons, knobs, or any other suitable interface control object. The image appearance control and the results of its user interaction can be directly and immediately visible on a display, during the course of a catheterization procedure.

According to one embodiment, an ultrasound imaging system includes a processor circuit configured for communication with an ultrasound imaging device positioned with respect to a body of a patient. The processor circuit is configured to: receive image data from the ultrasound imaging device; and output, to a display in communication with the processor circuit, a screen display comprising: an image generated based on the image data; and a user control comprising a plurality of control positions. The processor circuit is further configured to: receive a control input associated with a single selected position of the user control; determine at least two image setting values based on the single selected position; generate an updated image based on the image and the at least two image setting values, wherein the at least two image setting values are associated with a visual appearance of the updated image; and update the screen display to display the updated image.

In some embodiments, the user control comprises a virtual knob or slider. In some embodiments, the plurality of control positions comprises a plurality of control position ranges, and each control position range is associated with a different image setting of a plurality of image settings. In some embodiments, the at least two image setting values comprise a brightness setting value, and the processor circuit is configured to determine the brightness setting value based on the single selected position of the user control when the single selected position is within a brightness range of the plurality of control position ranges. In some embodiments, the at least two image setting values comprise a contrast setting value, and the processor circuit is configured to determine the contrast setting value based on the single selected position of the user control when the single selected position is within a contrast range of the plurality of control position ranges. In some embodiments, the at least two image setting values comprise a gain setting value, and the processor circuit is configured to determine the gain setting value based on the single selected position of the user control when the single selected position is within a gain range of the plurality of control position ranges. In some embodiments, the at least two image setting values comprise a hue setting value, and the processor circuit is configured to determine the hue setting value based on the single selected position of the user control when the single selected position is within a hue range of the plurality of control position ranges. In some embodiments, the at least two image setting values comprise a luminance setting value, and the processor circuit is configured to determine the luminance setting value based on the single selected position of the user control when the single selected position is within a luminance range of the plurality of control position ranges.

In some embodiments, the user control comprises a legend, and each of the control position ranges comprises a graphical representation of a corresponding image setting. In some embodiments, the graphical representation comprises at least one of a grayscale gradient or a color gradient. In some embodiments, the at least two image setting values are associated with at least two image settings of the plurality of image settings, and the screen display further comprises a second user control comprising a second plurality of control positions. In some embodiments, the processor circuit is further configured to: receive a second control input related to a second selected position of the second user control; based on the second selected position, determine at least two second image setting values different from the at least two image setting values; generate a second updated image based on the image data and the at least two second image setting values; and update the screen display to display the second updated image.

According to another embodiment of the present disclosure, an intraluminal ultrasound imaging method includes: receiving, by a processor circuit, image data from an ultrasound imaging device positioned with respect to a body of a patient; and outputting, by the processor circuit, to a display, a screen display comprising: an image generated based on the image data; and a user control comprising a plurality of control positions. The method further comprises: receiving, by the processor circuit, a control input associated with a single selected position of the user control; determining, by the processor circuit, at least two image setting values based on the single selected position; generating, by the processor circuit, an updated image based on the image and the at least two image setting values, wherein the at least two image setting values are associated with a visual appearance of the updated image; and updating, by the processor circuit, the screen display to display the updated image.

In some embodiments, the plurality of control positions comprises a plurality of control position ranges. In some embodiments, each control position range is associated with a different image setting of a plurality of image settings. In some embodiments, determining the at least two image setting values comprises determining, based on the single selected position of the user control when the single selected position is within a brightness range, a brightness setting value. In some embodiments, determining the at least two image setting values comprises determining, based on the single selected position of the user control when the single selected position is within a contrast range, a contrast setting value. In some embodiments, determining the at least two image setting values comprises determining, based on the single selected position of the user control when the single selected position is within a gain range, a gain setting value. In some embodiments, determining the at least two image setting values comprises determining, based on the single selected position of the user control when the single selected position is within a hue range, a hue setting value. In some embodiments, determining the at least two image setting values comprises determining, based on the single selected position of the user control when the single selected position is within a luminance range, a luminance setting value. In some embodiments, determining the at least two image setting values comprises determining, based on the single selected position of the user control when the single selected position is within a saturation range, a saturation setting value.

According to another embodiment of the present disclosure, an intravascular ultrasound (IVUS) imaging system includes: an IVUS imaging catheter; and a processor circuit configured for communication with the IVUS imaging catheter. The processor circuit is configured to: store, in a memory, a plurality of image setting values associated with a plurality of image settings; receive image data from the IVUS imaging catheter; generate an IVUS image based on the image data and the plurality of image setting values; output, to a display in communication with the processor circuit, a screen display comprising: the IVUS image; and a graphical user interface comprising a control element configured to be moved to a plurality of control positions; receive a control input to move the control element to a single selected position of the graphical user interface; based on the single selected position, determine at least two altered image setting values associated with at least two image settings of the plurality of image settings; generate an updated IVUS image based on the image data and the at least two altered image setting values; and update the screen display to display the updated IVUS image.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the image appearance control, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
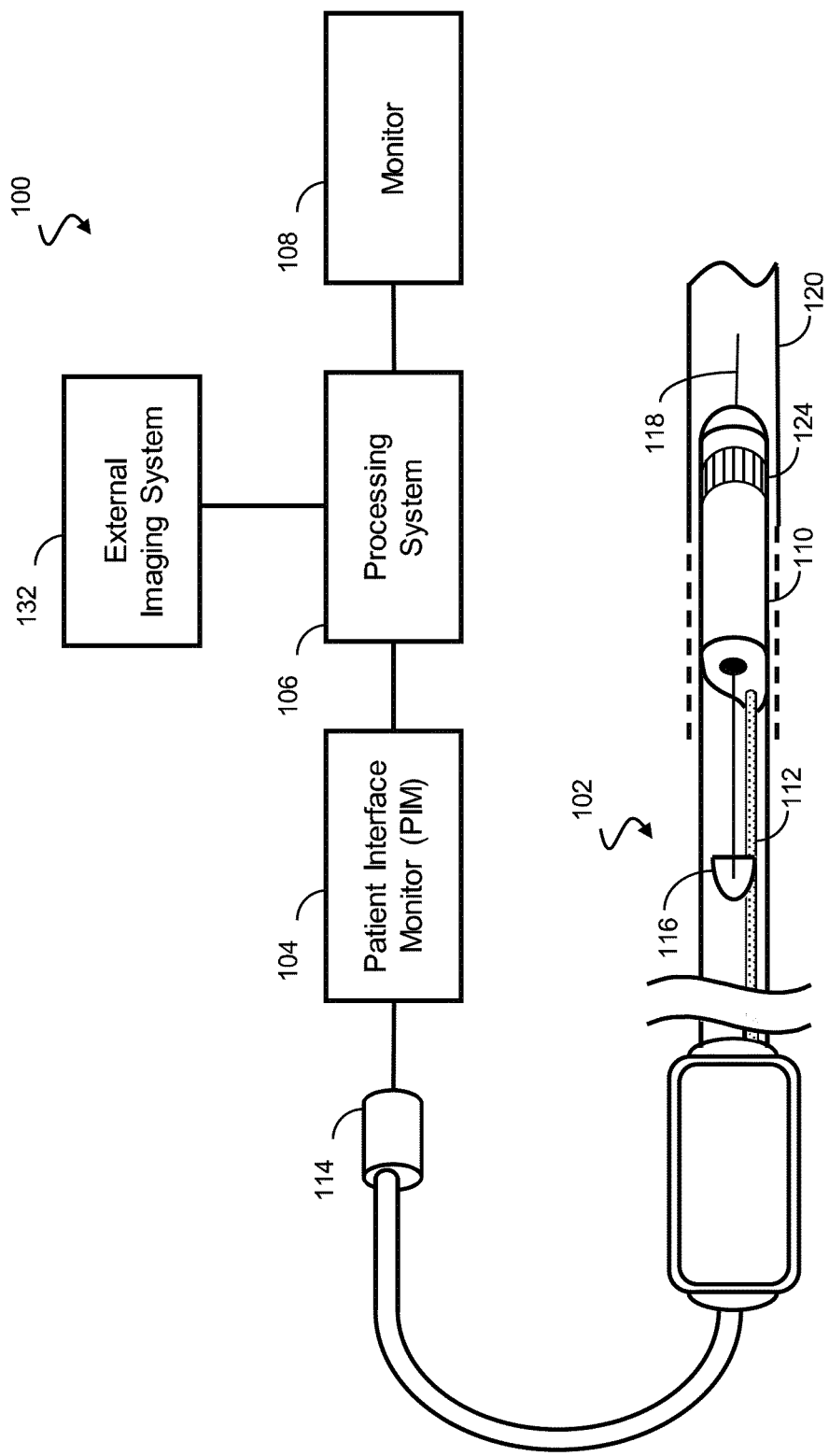
FIG. 1 is a diagrammatic schematic view of an intraluminal imaging system incorporating an image appearance control, in accordance with aspects of the present disclosure.

The present disclosure relates generally to medical imaging, including imaging associated with a body of a patient using intraluminal and/or external imaging devices. In accordance with at least one embodiment of the present disclosure, a system is provided for conveniently adjusting multiple inputs that affect image appearance, by using a single user control. In some embodiments, multiple user controls can be used, each user control configured to adjust multiple inputs that affect image appearance.

The current disclosure provides a way to provide enhanced image display and interpretation for medical images by integrating multiple color and grayscale image adjustments into a simple, intuitive "appearance" control such as a virtual knob or slider on a touchscreen. Such adjustments may include, but are not limited to, dynamic range, grayscale contrast and brightness, color palette, hue, saturation, color temperature, and any other suitable appearance control. This enables interpretation of medical images to take place immediately during the catheterization procedure, rather than being delegated to a separate, post-procedure radiologist review session. Quick and reliable identification of all the various anatomical structures of clinical interest in medical images may be challenging. Medical imaging technicians may desire more flexibility in image interpretation via changes to image settings. To avoid unwanted complexity, a steep learning curve, and user overwhelm, it is desirable for the display controls to be simple and intuitive while still offering the necessary flexibility.

Further, image interpretation and image quality are subjective and do not always conform to strictly conventional or objective image quality standards. Modifying display settings according to the subjective preferences may be similarly important as is using objectively "correct" or appropriate image acquisition and display settings. Moreover, the display hardware and display environment (e.g., room lighting, monitor type) may affect which settings are best or adequate for interpreting different types of images. The embodiments provided herein allow for the selection of image acquisition and display settings that are both conventionally and subjectively tailored to improve image interpretation for a variety of image-viewing circumstances and components.

Image colorization via intensity and region-based color mapping allows the system to provide different visual appearances for image elements that otherwise, with a traditional grayscale control, could be equally oversaturated or over-suppressed at the ends of the dynamic range. The image appearance control of the present disclosure merges a grayscale control and a colorization control into a single element of user interface for unified changes of brightness, contrast, color map, and dynamic range. Embodiments of the present disclosure provide simplified interfaces for enhanced utility, such that medical imaging technicians can choose their preference among a broad range of visualization configurations with, for example, a single click, tap, or slide action.

An example unified appearance control can alter or modify various visual characteristics of the image. The image appearance control may for example comprise: (1) a primary grayscale sector that can change overall brightness and contrast arrangement, and/or (2) a secondary colorization sector that can change the color mapping arrangement applied to the underlying IVUS image. In another example, the image appearance control may for example additionally comprise: (1) primary global setting sector that can change overall appearance, including hue/saturation, Brightness and contrast, and/or (2) a secondary local setting sector that can change the display mapping differently within the image itself. Both the primary and secondary sectors may be merged into a single control that seamlessly transitions between all available visualization arrangements. Thus, a single, unified, intuitive control can change medical image appearance from grayscale to color, and many contrast levels in between, in a single user action. The image appearance control and the results of its user interaction can be directly and immediately visible on display, thus improving both the imaging workflow and the quality, clarity, or interpretability of the real-time medical images.

The image appearance control may be implemented as a virtual knob or slider viewable on a display, and operated by a control process executing on a processor that accepts user inputs from a keyboard, mouse, physical button, knob, dial, or touchscreen interface, and that is in communication with one or more intraluminal sensors. In that regard, the control process performs certain specific operations in response to different inputs or selections made at different times. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope of the image appearance control. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. For example, while the embodiments described below may refer specifically to intravascular ultrasound (IVUS) imaging, it will be understood that the embodiments of the present disclosure apply to any suitable medical imaging modality, including forward looking IVUS (FL-IVUS), fractional flow reserve (FFR) determination, coronary flow reserve (CFR) determination, optical coherence tomography (OCT), trans-esophageal echocardiography (TEE), transthoracic echocardiography (TTE), and any other suitable medical imaging modality. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a diagrammatic schematic view of an intraluminal imaging system incorporating an image appearance control, in accordance with aspects of the present disclosure. The intraluminal imaging system 100 can be an intravascular ultrasound (IVUS) imaging system in some embodiments. The intraluminal imaging system 100 may include an intraluminal device 102, a patient interface module (PIM) 104, a console or processing system 106, a monitor or display 108, and an external imaging system 132 which may include angiography, ultrasound, X-ray, computed tomography (CT), magnetic resonance imaging (MRI), or other imaging technologies, equipment, and methods. The intraluminal device 102 is sized and shaped, and/or otherwise structurally arranged to be positioned within a body lumen of a patient. For example, the intraluminal device 102 can be a catheter, guide wire, guide catheter, pressure wire, and/or flow wire in various embodiments. In some circumstances, the system 100 may include additional elements and/or may be implemented without one or more of the elements illustrated in FIG. 1. For example, the system 100 may omit the external imaging system 132.

The intraluminal imaging system 100 (or intravascular imaging system) can be any type of imaging system suitable for use in the lumens or vasculature of a patient. In some embodiments, the intraluminal imaging system 100 is an intraluminal ultrasound (IVUS) imaging system. In other embodiments, the intraluminal imaging system 100 may include systems configured for forward looking intraluminal ultrasound (FL-IVUS) imaging, intraluminal photoacoustic (IVPA) imaging, intracardiac echocardiography (ICE), transesophageal echocardiography (TEE), and/or other suitable imaging modalities.

It is understood that the system 100 and/or device 102 can be configured to obtain any suitable medical imaging data. In some embodiments, the device 102 may include an imaging component of any suitable imaging modality, such as optical imaging, optical coherence tomography (OCT), etc. In some embodiments, the device 102 may include any suitable non-imaging component, including a pressure sensor, a flow sensor, a temperature sensor, an optical fiber, a reflector, a mirror, a prism, an ablation element, a radio frequency (RF) electrode, a conductor, or combinations thereof. Generally, the device 102 can include an imaging element to obtain intraluminal imaging data associated with the lumen 120. The device 102 may be sized and shaped (and/or configured) for insertion into a vessel or lumen 120 of the patient.

The system 100 may be deployed in a catheterization laboratory having a control room. The processing system 106 may be located in the control room. Optionally, the processing system 106 may be located elsewhere, such as in the catheterization laboratory itself. The catheterization laboratory may include a sterile field while its associated control room may or may not be sterile depending on the procedure to be performed and/or on the health care facility. The catheterization laboratory and control room may be used to perform any number of medical imaging procedures such as angiography, fluoroscopy, CT, IVUS, virtual histology (VH), forward looking IVUS (FL-IVUS), intraluminal photoacoustic (IVPA) imaging, a fractional flow reserve (FFR) determination, a coronary flow reserve (CFR) determination, optical coherence tomography (OCT), computed tomography, intracardiac echocardiography (ICE), forward-looking ICE (FLICE), intraluminal palpography, transesophageal ultrasound, fluoroscopy, and other medical imaging modalities, or combinations thereof. In some embodiments, device 102 may be controlled from a remote location such as the control room, such than an operator is not required to be in close proximity to the patient.

The intraluminal device 102, PIM 104, monitor 108, and external imaging system 132 may be communicatively coupled directly or indirectly to the processing system 106. These elements may be communicatively coupled to the medical processing system 106 via a wired connection such as a standard copper link or a fiber optic link and/or via wireless connections using IEEE 802.11 Wi-Fi standards, Ultra Wide-Band (UWB) standards, wireless FireWire, wireless USB, or another high-speed wireless networking standard. The processing system 106 may be communicatively coupled to one or more data networks, e.g., a TCP/IP-based local area network (LAN). In other embodiments, different protocols may be utilized such as Synchronous Optical Networking (SONET). In some cases, the processing system 106 may be communicatively coupled to a wide area network (WAN). The processing system 106 may utilize network connectivity to access various resources. For example, the processing system 106 may communicate with a Digital Imaging and Communications in Medicine (DICOM) system, a Picture Archiving and Communication System (PACS), and/or a Hospital Information System via a network connection.

At a high level, an ultrasound imaging intraluminal device 102 emits ultrasonic energy from a transducer array 124 included in scanner assembly 110 mounted near a distal end of the intraluminal device 102. The ultrasonic energy is reflected by tissue structures in the medium (such as a lumen 120) surrounding the scanner assembly 110, and the ultrasound echo signals are received by the transducer array 124. The scanner assembly 110 generates electrical signal(s) representative of the ultrasound echoes. The scanner assembly 110 can include one or more single ultrasound transducers and/or a transducer array 124 in any suitable configuration, such as a planar array, a curved array, a circumferential array, an annular array, etc. For example, the scanner assembly 110 can be a one-dimensional array or a two-dimensional array in some instances. In some instances, the scanner assembly 110 can be a rotational ultrasound device. The active area of the scanner assembly 110 can include one or more transducer materials and/or one or more segments of ultrasound elements (e.g., one or more rows, one or more columns, and/or one or more orientations) that can be uniformly or independently controlled and activated. The active area of the scanner assembly 110 can be patterned or structured in various basic or complex geometries. The scanner assembly 110 can be disposed in a side-looking orientation (e.g., ultrasonic energy emitted perpendicular and/or orthogonal to the longitudinal axis of the intraluminal device 102) and/or a forward-looking looking orientation (e.g., ultrasonic energy emitted parallel to and/or along the longitudinal axis). In some instances, the scanner assembly 110 is structurally arranged to emit and/or receive ultrasonic energy at an oblique angle relative to the longitudinal axis, in a proximal or distal direction. In some embodiments, ultrasonic energy emission can be electronically steered by selective triggering of one or more transducer elements of the scanner assembly 110.

The ultrasound transducer(s) of the scanner assembly 110 can be a piezoelectric micromachined ultrasound transducer (PMUT), capacitive micromachined ultrasonic transducer (CMUT), single crystal, lead zirconate titanate (PZT), PZT composite, other suitable transducer type, and/or combinations thereof. In an embodiment the ultrasound transducer array 124 can include any suitable number of individual transducer elements or acoustic elements between 1 acoustic element and 1000 acoustic elements, including values such as 2 acoustic elements, 4 acoustic elements, 36 acoustic elements, 64 acoustic elements, 128 acoustic elements, 500 acoustic elements, 812 acoustic elements, and/or other values both larger and smaller.

The PIM 104 transfers the received echo signals to the processing system 106 where the ultrasound image (including the flow information) is reconstructed and displayed on the monitor 108. The console or processing system 106 can include a processor and a memory. The processing system 106 may be operable to facilitate the features of the intraluminal imaging system 100 described herein. For example, the processor can execute computer readable instructions stored on the non-transitory tangible computer readable medium.

The PIM 104 facilitates communication of signals between the processing system 106 and the scanner assembly 110 included in the intraluminal device 102. This communication may include providing commands to integrated circuit controller chip(s) within the intraluminal device 102, selecting particular element(s) on the transducer array 124 to be used for transmit and receive, providing the transmit trigger signals to the integrated circuit controller chip(s) to activate the transmitter circuitry to generate an electrical pulse to excite the selected transducer array element(s), and/or accepting amplified echo signals received from the selected transducer array element(s) via amplifiers included on the integrated circuit controller chip(s). In some embodiments, the PIM 104 performs preliminary processing of the echo data prior to relaying the data to the processing system 106. In examples of such embodiments, the PIM 104 performs amplification, filtering, and/or aggregating of the data. In an embodiment, the PIM 104 also supplies high- and low-voltage DC power to support operation of the intraluminal device 102 including circuitry within the scanner assembly 110.

The processing system 106 receives echo data from the scanner assembly 110 by way of the PIM 104 and processes the data to reconstruct an image of the tissue structures in the medium surrounding the scanner assembly 110. Generally, the device 102 can be utilized within any suitable anatomy and/or body lumen of the patient. The processing system 106 outputs image data such that an image of the vessel or lumen 120, such as a cross-sectional IVUS image of the lumen 120, is displayed on the monitor 108. Lumen 120 may represent fluid filled or fluid-surrounded structures, both natural and man-made. Lumen 120 may be within a body of a patient. Lumen 120 may be a blood vessel, such as an artery or a vein of a patient's vascular system, including cardiac vasculature, peripheral vasculature, neural vasculature, renal vasculature, and/or or any other suitable lumen inside the body. For example, the device 102 may be used to examine any number of anatomical locations and tissue types, including without limitation, organs including the liver, heart, kidneys, gall bladder, pancreas, lungs; ducts; intestines; nervous system structures including the brain, dural sac, spinal cord and peripheral nerves; the urinary tract; as well as valves within the blood vessel, chambers or other parts of the heart, and/or other systems of the body. In addition to natural structures, the device 102 may be used to examine man-made structures such as, but without limitation, heart valves, stents, shunts, filters and other devices.

The controller or processing system 106 may include a processing circuit having one or more processors in communication with memory and/or other suitable tangible computer readable storage media. The controller or processing system 106 may be configured to carry out one or more aspects of the present disclosure. In some embodiments, the processing system 106 and the monitor 108 are separate components. In other embodiments, the processing system 106 and the monitor 108 are integrated in a single component. For example, the system 100 can include a touch screen device, including a housing having a touch screen display and a processor. The system 100 can include any suitable input device, such as a touch sensitive pad or touch screen display, keyboard/mouse, joystick, button, etc., for a user to select options shown on the monitor 108. The processing system 106, the monitor 108, the input device, and/or combinations thereof can be referenced as a controller of the system 100. The controller can be in communication with the device 102, the PIM 104, the processing system 106, the monitor 108, the input device, and/or other components of the system 100.

In some embodiments, the intraluminal device 102 includes some features similar to traditional solid-state IVUS catheters, such as the EagleEye® catheter available from Volcano Corporation and those disclosed in U.S. Pat. No. 7,846,101 hereby incorporated by reference in its entirety. For example, the intraluminal device 102 may include the scanner assembly 110 near a distal end of the intraluminal device 102 and a transmission line bundle 112 extending along the longitudinal body of the intraluminal device 102. The cable or transmission line bundle 112 can include a plurality of conductors, including one, two, three, four, five, six, seven, or more conductors.

The transmission line bundle 112 terminates in a PIM connector 114 at a proximal end of the intraluminal device 102. The PIM connector 114 electrically couples the transmission line bundle 112 to the PIM 104 and physically couples the intraluminal device 102 to the PIM 104. In an embodiment, the intraluminal device 102 further includes a guidewire exit port 116. Accordingly, in some instances the intraluminal device 102 is a rapid-exchange catheter. The guidewire exit port 116 allows a guidewire 118 to be inserted towards the distal end in order to direct the intraluminal device 102 through the lumen 120.

The monitor 108 may be a display device such as a computer monitor or other type of screen. The monitor 108 may be used to display selectable prompts, instructions, and visualizations of imaging data to a user. In some embodiments, the monitor 108 may be used to provide a procedure-specific workflow to a user to complete an intraluminal imaging procedure. This workflow may include performing a pre-stent plan to determine the state of a lumen and potential for a stent, as well as a post-stent inspection to determine the status of a stent that has been positioned in a lumen.

The external imaging system 132 can be configured to obtain x-ray, radiographic, angiographic/venographic (e.g., with contrast), and/or fluoroscopic (e.g., without contrast) images of the body of patient (including the vessel 120). External imaging system 132 may also be configured to obtain computed tomography images of the body of patient (including the vessel 120). The external imaging system 132 may include an external ultrasound probe configured to obtain ultrasound images of the body of the patient (including the vessel 120) while positioned outside the body. In some embodiments, the system 100 includes other imaging modality systems (e.g., MRI) to obtain images of the body of the patient (including the vessel 120). The processing system 106 can utilize the images of the body of the patient in conjunction with the intraluminal images obtained by the intraluminal device 102.

In some embodiments, the external imaging system 132 is an extraluminal imaging system or external imaging system. Screen displays incorporating information from the external imaging system may include raw images, processed images, or stylized diagrams or cartoons of the body lumen. The processing system 106 can be in communication with an external imaging device (e.g., MRI, CT, x-ray such as angiography and/or fluoroscopy, or external ultrasound), and a displayed external or extraluminal view can be an external image itself or a 2D/3D reconstruction of the body lumen based on the external image, and in some embodiments the external or extraluminal view may include an indicator identifying a location of the intraluminal ultrasound image along a length of the body lumen in the external or extraluminal view.

Figure 2:
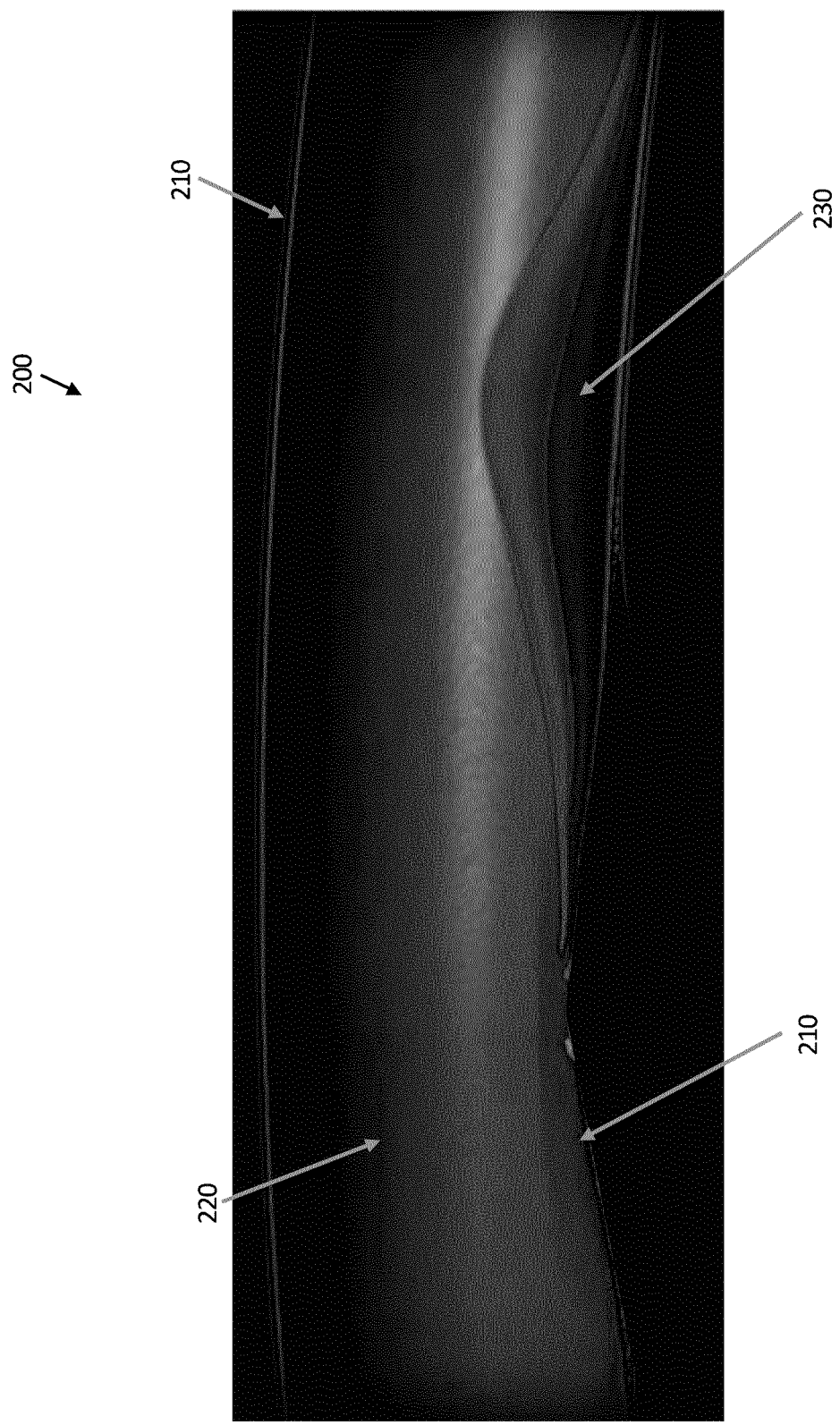
FIG. 2 is a cross-sectional view of a blood vessel incorporating a stenosis.

FIG. 2 illustrates a blood vessel 200 incorporating a stenosis 230. The stenosis may for example occur between the vessel walls 210 and may restrict the flow of blood 220. Stenoses come in many types, including but not limited to thrombuses, webbing, plaques, and constrictions. A physician may perform an intraluminal imaging procedure to determine the severity and/or classification of the stenosis 230 for diagnostic and therapeutic planning purposes. For example, a pullback procedure may be performed to obtain a plurality of cross-sectional images of the vessel 200 and the stenosis 230.

Figure 3:
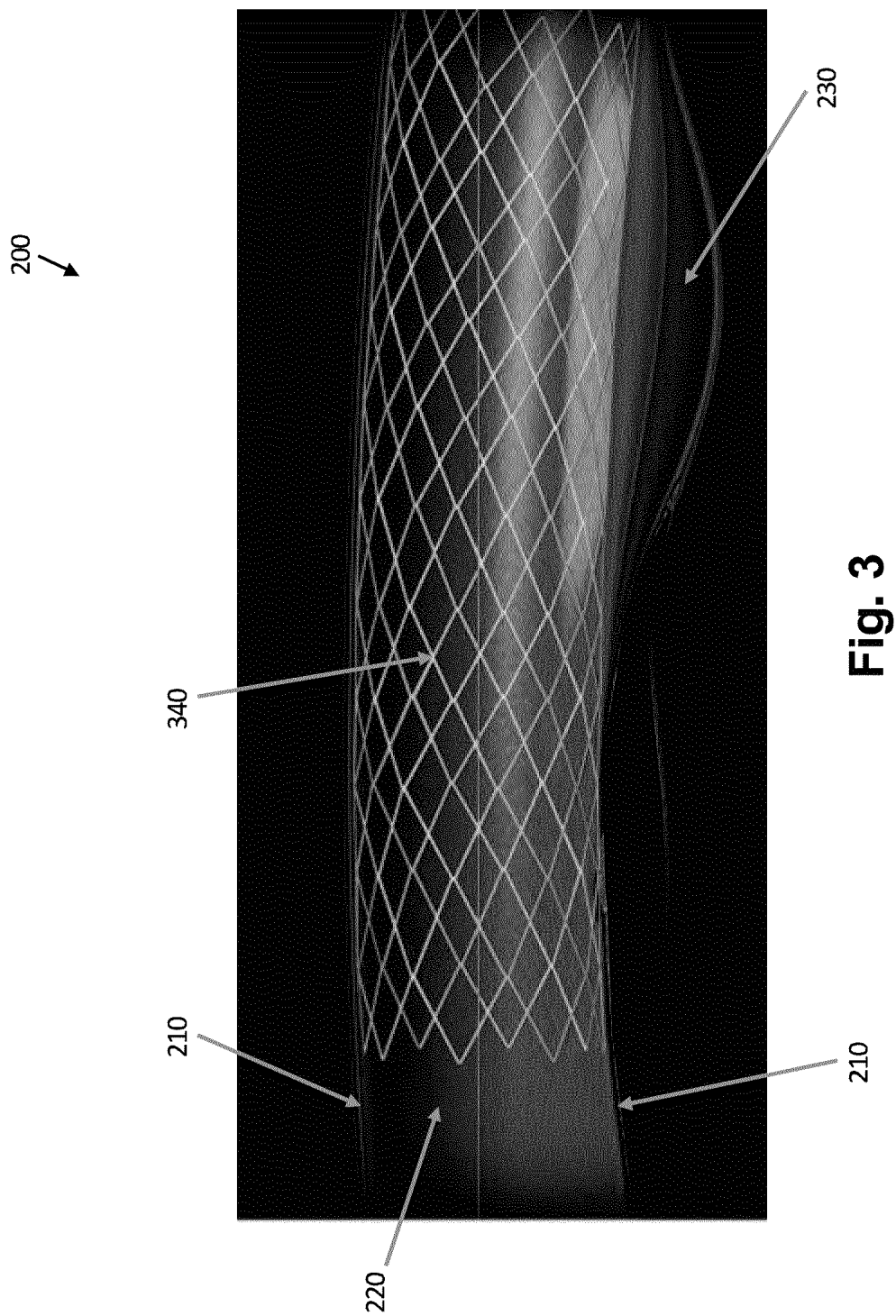
FIG. 3 is a cross-sectional view of a blood vessel incorporating a stenosis and with a stent expanded inside it to restore flow.

FIG. 3 illustrates a blood vessel 200 incorporating a stenosis 230 and with a stent 340 expanded inside it to restore flow. The stent 340 compresses and arrests the stenosis 230, opening the blood vessel 200 and preventing material from the stenosis 230 from traveling through the blood vessel 200. The stent 340 also pushes the vessel walls 210 outward, thus reducing the flow restriction for the blood 220. Other treatment options for alleviating an occlusion may include but are not limited to thrombectomy, ablation, angioplasty, and pharmaceuticals. However, in a large majority of cases it may be highly desirable to obtain accurate and timely intravascular images of the affected area, along with accurate and detailed knowledge of the location of the affected area prior to, during, or after treatment. While FIG. 3 illustrates an image of an artery including a stenosis, intravascular imaging such as IVUS may also be used in the veins and/or peripheral vasculature, or in the veins. For example, intravascular imaging may be used to detect and/or assess venous compression.

Figure 4:
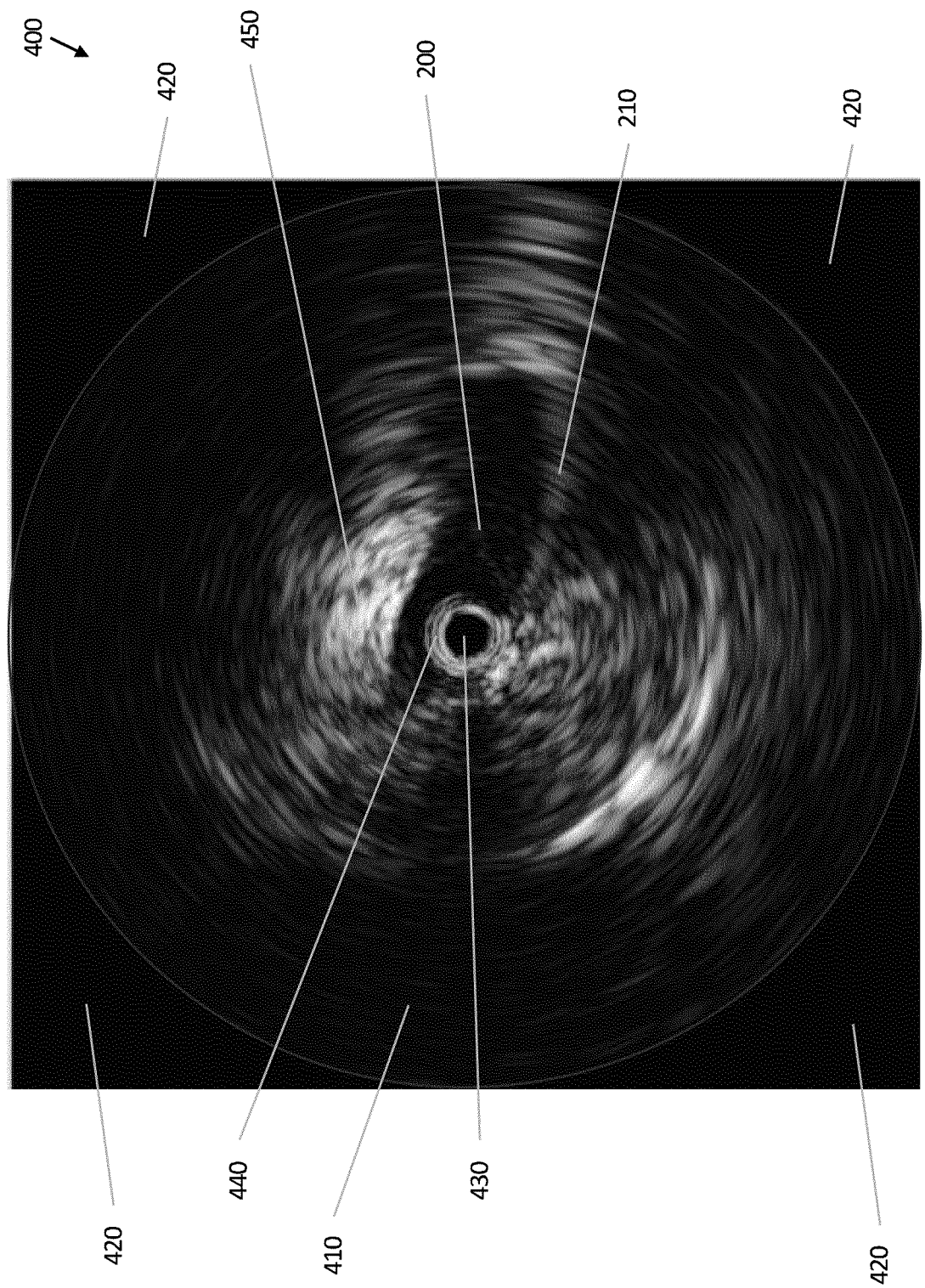
FIG. 4 is an example intravascular ultrasound (IVUS) image, in accordance with aspects of the present disclosure.

FIG. 4 is an example intravascular ultrasound (IVUS) image 400, in accordance with aspects of the present disclosure. The IVUS image 400 is constructed from intensity-vs.-time curves for echoes received from ultrasound pulses or waves emitted by the ultrasound transducer or transducers. Visible is a circular image region 410 that contains the IVUS image data, and four corner regions 420 that do not contain image data. At the center of the image region 410 is a circular "mask" region 430 representing the intraluminal imaging probe itself. In some cases, the mask region 430 is surrounded by ringdown artifacts 440 that do not represent anatomical structures. Also visible in this IVUS image 400 are a blood vessel 200, vessel wall 210, and extraluminal tissue 450. The extraluminal tissue may include for example bones, organs, muscles, fat, connective tissue, or neighboring vessels or lumens.

Figure 5:
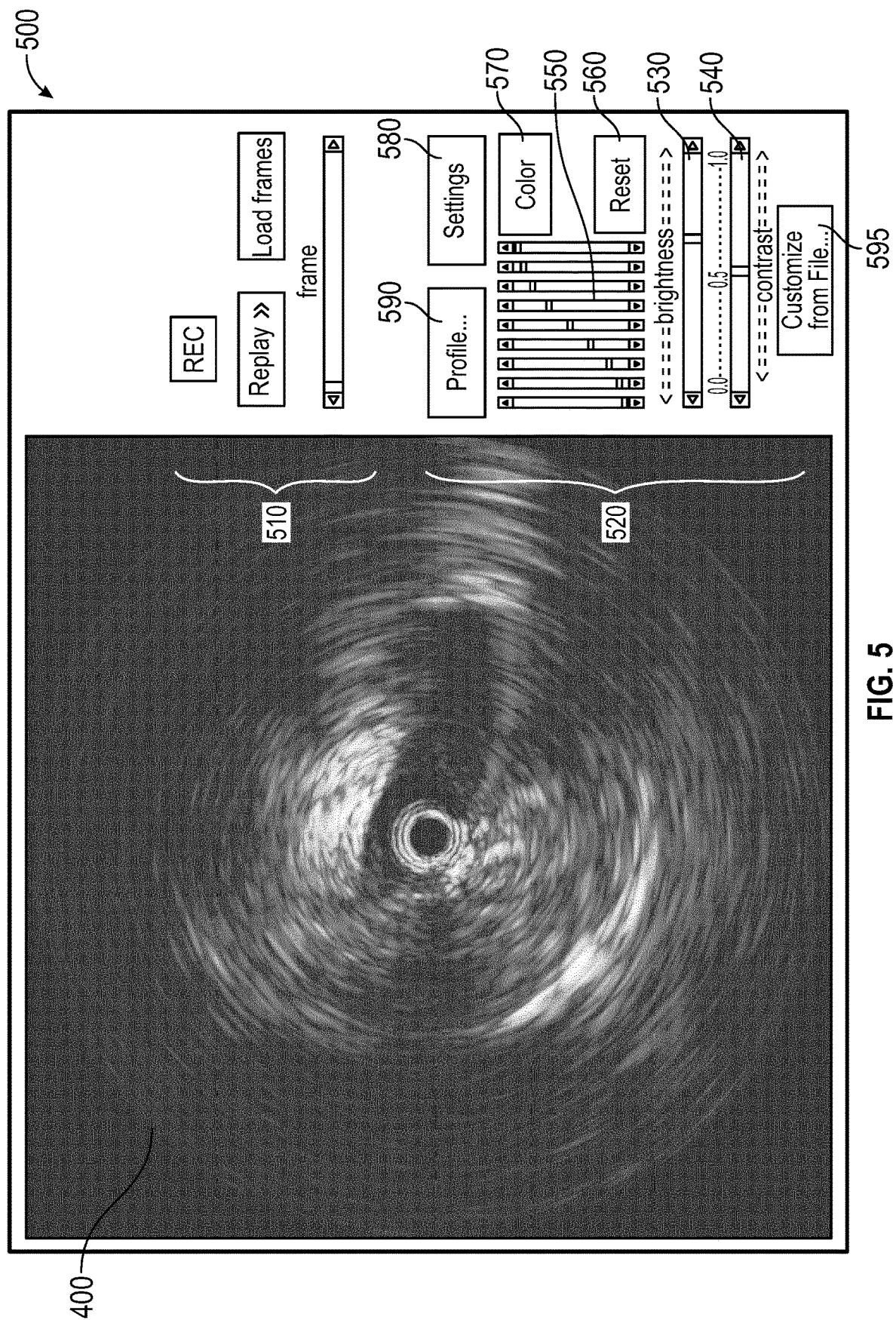
FIG. 5 is an example IVUS image adjustment screen display, in accordance with at least one embodiment of the present disclosure.

FIG. 5 is an example intravascular ultrasound (IVUS) image adjustment screen display 500, in accordance with at least one embodiment of the present disclosure. The screen display 500 includes an IVUS image 400, along with image navigation controls 510 and image adjustment controls 520. In the example shown in FIG. 5, the image adjustment controls 520 include a brightness control 530 and contrast control 540, which affect the appearance of pixels throughout the IVUS image 400, and a gain curve adjustment control 550, which affects the mapping between received (echo) signal intensity and the brightness of displayed pixels in the image 400. For example, a linear gain curve adjustment 550 will result in a pixel brightness that is directly proportional to the received signal strength, whereas non-linear gain curve adjustment 550 (as shown) results in a non-linear relationship between received signal strength and the brightness or intensity of the corresponding pixels. Thus, the gain curve adjustment 550 can affect different portions of the image 400 in different ways, depending for example on the density of liquid or tissue at different locations within the image 400.

In this example, the image adjustment controls 520 also include a Reset control 560 which restores default settings for all other adjustment controls, a Color control 570 which brings the user to another set of image adjustment controls for a color palette configuration, a Settings control 580 which brings the user to another set of image adjustment controls for a signal preprocessing configuration (parameters of filters, ringdown suppression, range-gain compensation etc.), an Profile control 590 which sets all other controls into a specific configuration that can be configured to a particular use profile/user profile, and a "Customize from File" control 595 which allows the user to load a pre-configured choice of settings from a file. Other embodiments may include other controls, including but not limited to color palette selection, corner color selection, speckle reduction or noise reduction, ringdown subtraction, sharpness, or virtual histology.

Interpretation of IVUS images can be difficult and may involve a high level of skill. Optimization of image adjustment settings 520 can help increase the visibility of clinically significant features in an IUS image 400, thus easing the task of image interpretation. However, the number and complexity of image adjustment controls 520 mean that the number of possible image setting combinations is extremely large. This places a burden on clinicians and other operators, to memorize the individual and combined effects of different image settings in order to enhance particular kinds of features. This difficulty level results in a steep learning curve, as well as time and energy spent optimizing the image in real time during an intravascular imaging procedure. For this reason, image optimization and image interpretation are often outsourced to a skilled radiologist after the procedure is complete.

In some embodiments, multiple different image settings 520 can be adjusted simultaneously by loading an image preset, which may for example be a file or record containing values for the multiple different image settings 520 that have been optimized or selected for a particular task, such as imaging of arterial plaques, imaging of a stent within a vessel, etc. This can aid a clinician or other user in selecting the appropriate image adjustment settings 520. However, if the clinician or other user is not satisfied with the settings in a given preset for a given image, it may still be necessary to manually adjust one or more image adjustment controls 520, in real time during the procedure. This can require significant time and skill, as well as multiple complex interactions with a touch screen or other control interface.

Figure 6:
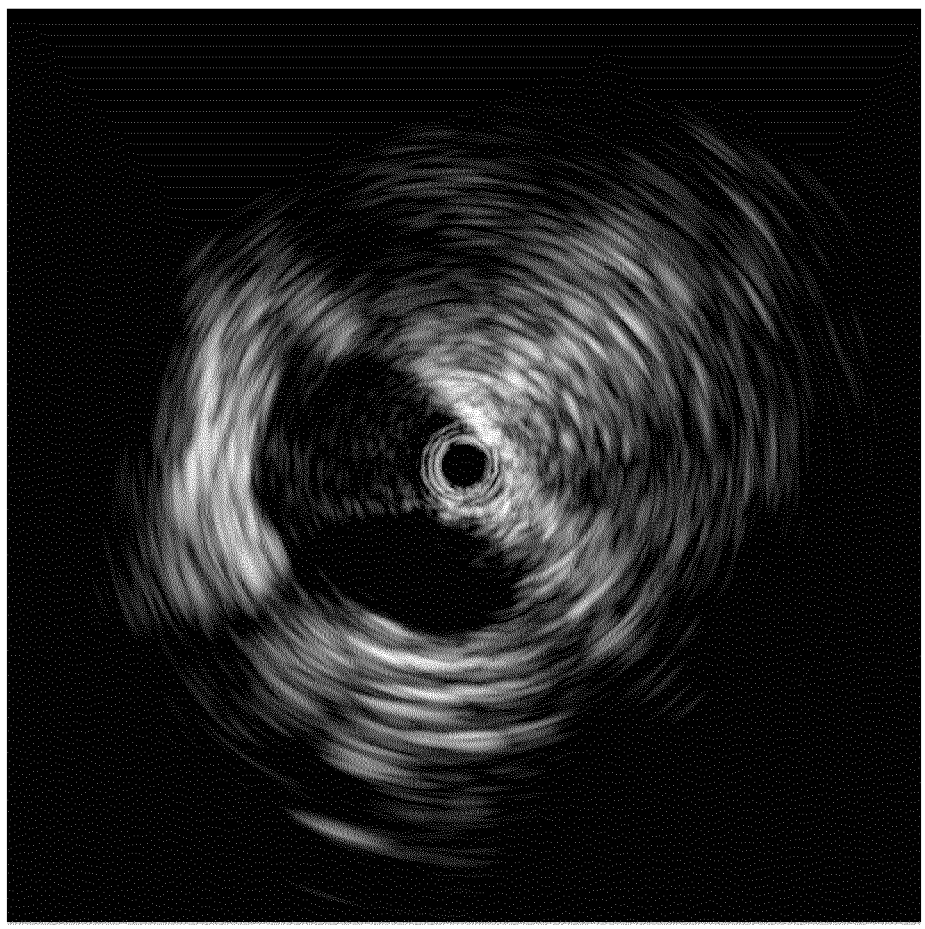
FIG. 6 is an example IVUS image following a grayscale brightness adjustment, in accordance with at least one embodiment of the present disclosure.

FIG. 6 is an example grayscale intravascular ultrasound (IVUS) image 600 generated based on a first set of image setting values, in accordance with at least one embodiment of the present disclosure. In some aspects, embodiments described herein may be configured to generate images using a default set of image setting values, such as brightness values. Increasing or decreasing brightness may affect the intensity of all pixels in the image, whether increasing or decreasing, in a consistent way. This can cause certain features of the image 600 to become more or less visible.

Figure 7:
FIG. 7 is an example IVUS image following a grayscale contrast adjustment, in accordance with at least one embodiment of the present disclosure.

FIG. 7 is an example IVUS image 700 following a grayscale contrast adjustment, in accordance with at least one embodiment of the present disclosure. Increasing or decreasing contrast may affect the dynamic range of all pixels in the image in a consistent way. This can cause certain features of the image 700 to become more or less visible.

Figure 8B:
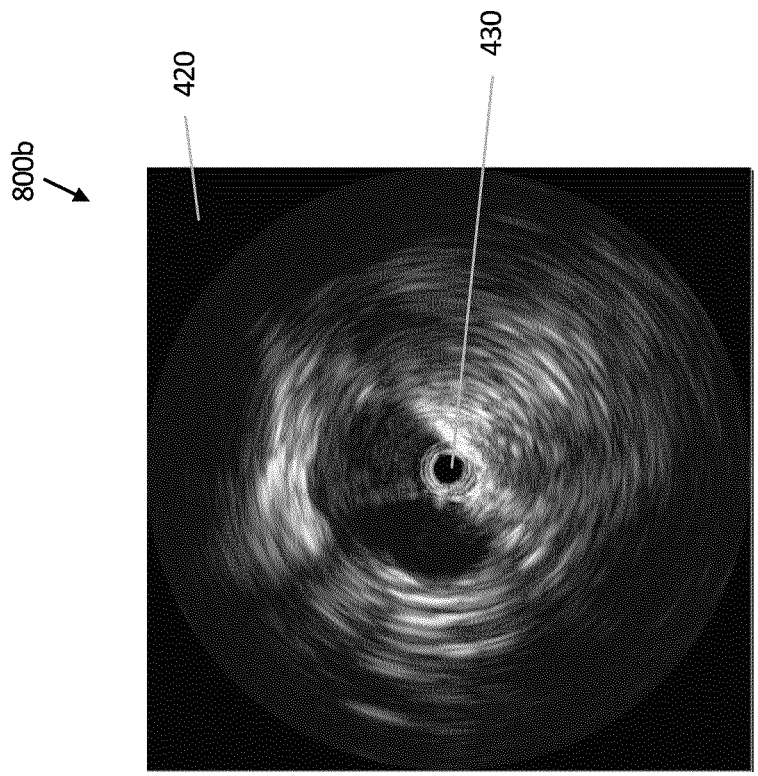
FIG. 8b is an example IVUS image following a color adjustment, in accordance with at least one embodiment of the present disclosure.
Figure 8A:
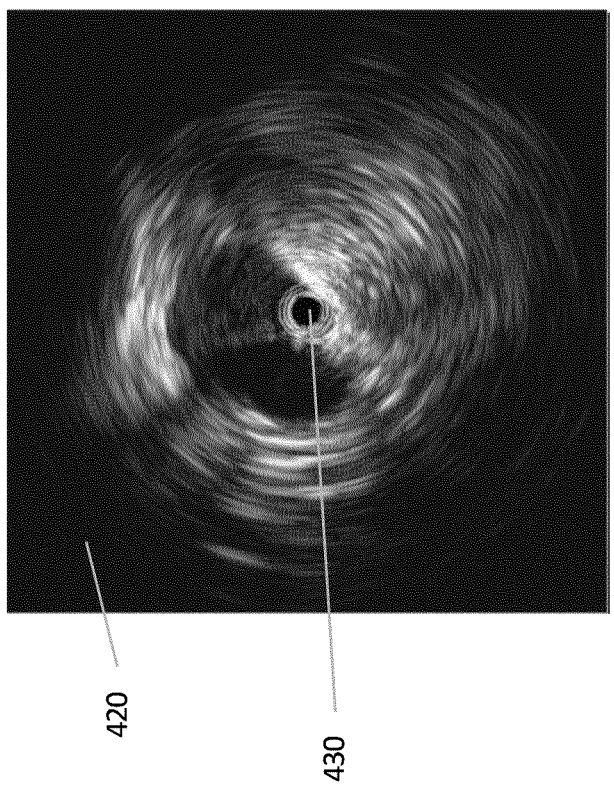
FIG. 8a is an example IVUS image following a color adjustment, in accordance with at least one embodiment of the present disclosure.

FIG. 8a is an example IVUS image 800a following a color adjustment, in accordance with at least one embodiment of the present disclosure. In this example, the grayscale image has been replaced with a warmer (sepia) color scale. This can cause certain features of the image 800a to become more or less visible. The colorization applies to all portions of the image, including the corner regions 420, but excluding the mask region 430, which is colored black. In some cases, having corner regions tinted can reduce the apparent contrast of the image, making it appear "washed out."

FIG. 8b is an example IVUS image 800b following a color adjustment, in accordance with at least one embodiment of the present disclosure. In this example, the grayscale image has been replaced by the same warmer (sepia) color scale shown in FIG. 8a. However, in this case the colorization applies to all portions of the image except the mask 430 and corner regions 420. Because of the response of the human visual system, providing a black color in these regions can enhance the apparent contrast of the image 800b, even if no other changes to the image are made.

Figure 9:
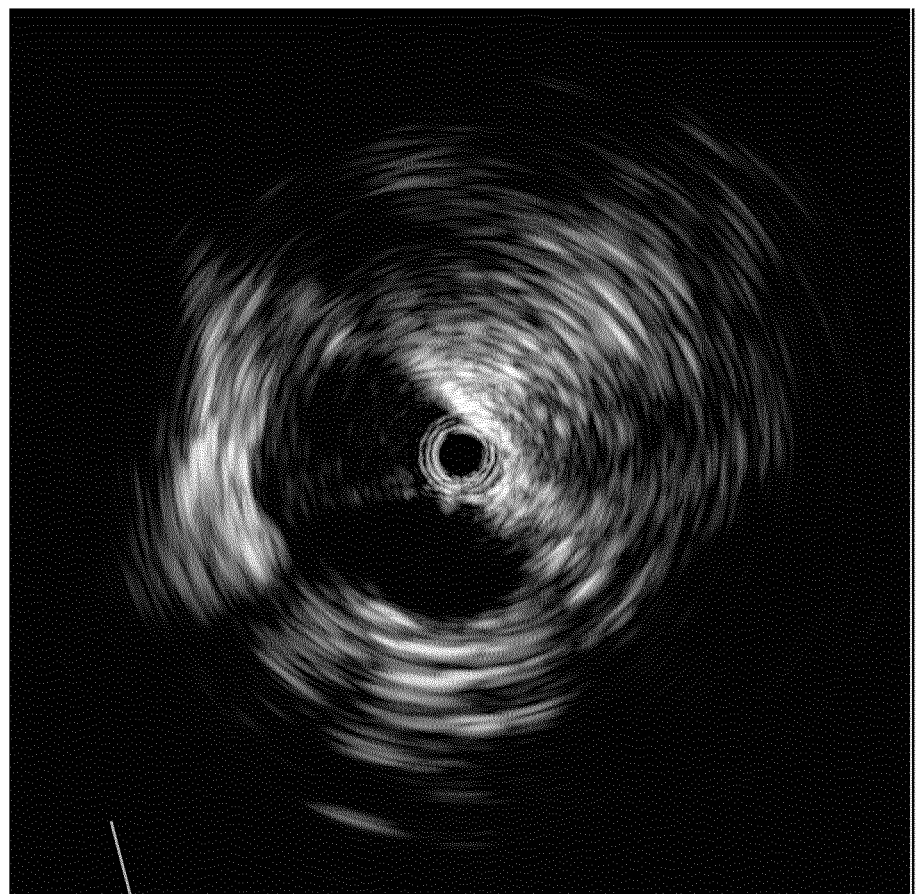
FIG. 9 is an example IVUS image following a color adjustment, in accordance with at least one embodiment of the present disclosure.

FIG. 9 is an example IVUS image 900 following a color adjustment, in accordance with at least one embodiment of the present disclosure. In this example, the grayscale image has been replaced by a cooler (violet) color scale. However, in this case the colorization applies to all portions of the image, except that it may or may not affect the corner regions 420, which are normally colored black.

Figure 10:
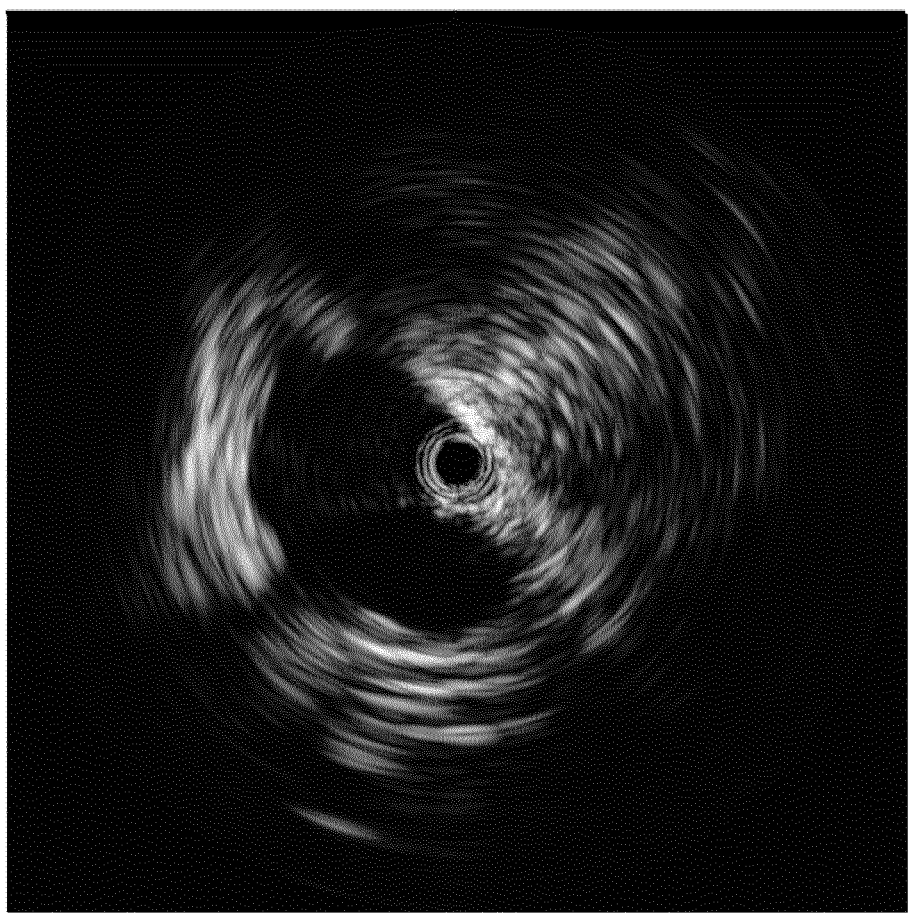
FIG. 10 is an example IVUS image following a region-based color adjustment, in accordance with at least one embodiment of the present disclosure.

FIG. 10 is an example IVUS image 1000 following a region-based color adjustment, in accordance with at least one embodiment of the present disclosure. In this example, the hue, saturation or luminance of the image in different locations is dependent on signal strength or density in those locations. This can cause certain features of the image 1000 to become more or less visible.

Figure 11:
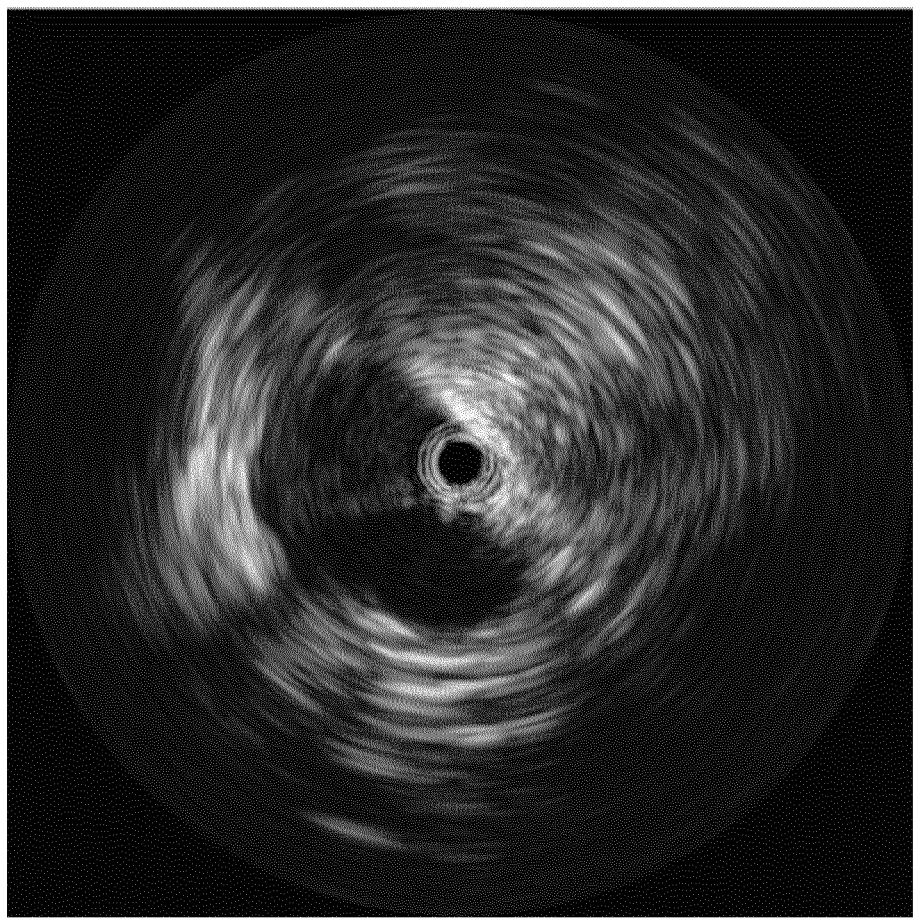
FIG. 11 is an example IVUS image following a region-based color adjustment, in accordance with at least one embodiment of the present disclosure.

FIG. 11 is an example IVUS image 1100 following a region-based color adjustment, in accordance with at least one embodiment of the present disclosure. In this example, the hue of the image in different locations is dependent on signal strength or density in those locations. This can cause certain features of the image 1000 to become more or less visible. In the example shown in FIG. 11, pixels with a "blood-like" return signal strength have been tinted slightly red, whereas pixels with a tissue-like return signal strength have been tinted slightly blue, which can help a clinician or other user distinguish between features such as blood vessel lumens, blood vessel walls, intraluminal plaques, clots, or thrombuses, and extraluminal tissue such as organs, muscles, fat, connective tissue, and bone. Other color pallets and other return signal cues may be used instead or in addition, to bring out features that are clinically significant for different procedures or body systems. Additional details and disclosure regarding visualizing blood and tissue can be found in U.S. Pat. No. 10,292,676, filed Dec. 20, 2012, the entirety of which is incorporated by reference.

Figure 12:
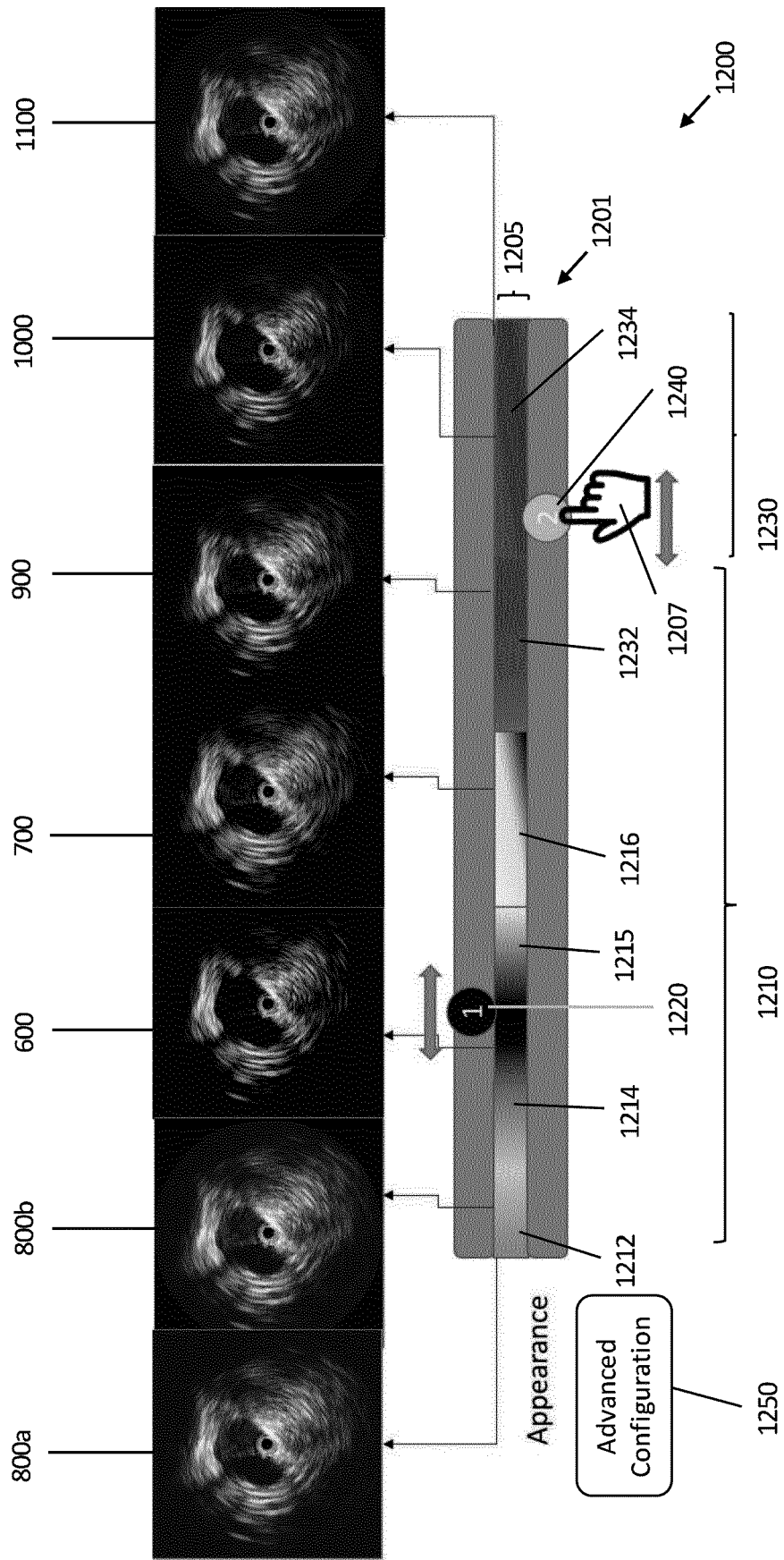
FIG. 12 is a diagrammatic representation of an example image appearance control, in accordance with at least one embodiment of the present disclosure.

FIG. 12 is an example image appearance control graphical user interface 1200, in accordance with at least one embodiment of the present disclosure. In this example, the image appearance control GUI 1200 comprises a slider 1201 (e.g., a touchscreen slider) that includes a grayscale range or region 1210 with a grayscale slider control 1220, and a colorization range or region 1230 with a colorization slider control 1240. Each of the slider controls 1220 and 1240 can be operated by a user's hand 1207. The image appearance control GUI 1200 may also include a visual guide 1205 or legend that provides a visual indication of the different image control settings that are affected by different regions of the slider 1201. In the illustrated embodiment, the visual guide includes a legend whose sub-regions (e.g., sepia tone selection region 1212, brightness region 1214) include gradient patterns representative of the image setting changes as the respective slider control 1220, 1240 is moved left or right. In some embodiments, vertical gradients along the visual guide 1205 can indicate settings that affect the entire image equally, whereas diagonal gradients along the visual guide 1205 can indicate region-based settings that can affect different portions or pixels of the image differently, although other patterns or visual indications may be used instead or in addition to the gradients shown in FIG. 12.

In the non-limiting example shown in FIG. 12, the grayscale region 1210 of the slider 1201 includes a yellow tone or sepia tone selection region or sub-region 1212, that replaces the grayscale with a sepia scale, either with corners (as shown in example image 800*a*) or without corners (as shown in example image 800*b*). The sepia tone selection region 1212 includes a horizontal gradient visual guide where the darker, or deeper tones on the visual guide 1205 correspond to deeper or darker sepia tones applied to the corresponding image (8001, 800*b*). The grayscale region 1210 also includes a brightness region 1214 that includes a horizontal gradient. Movement of the slider control 1220 to positions left or right along the gradient within the grayscale region 1214 brightens or darkens the entire image uniformly (as shown for example in image 600). The grayscale region 1210 further includes a contrast region or sub-region 1215, where movement of the slider control 1220 shifts the dynamic range of the entire image uniformly (as shown for example in image 700). In some cases, a contrast control may be used to invert the grayscale and create a "negative" image. In some embodiments, the grayscale region 1210 may also include a gain curve adjustment region 1216, that changes the relationship between input intensity and output intensity, such that regions of higher density or stronger return signal are affected differently than regions of lower density or weaker return signal.

In the same non-limiting example, the colorization region 1230 includes multiple color gradient patterns corresponding to the different colorization sub-regions explained further below. For example, the colorization region 1230 includes a hue control region 1232 wherein the grayscale is replaced by a color scale, with warmer colors such as yellow and orange on the left side, and cooler colors such as blue and violet on the right side. Depending on the position of the slider control 1240, color selections may either include or exclude the corner regions of the image. The colorization region 1230 includes a region-based color mapping region 1234, wherein the hue, luminance, and/or saturation of different portions of the image are adjusted based on the density or return signal strength of the individual pixels. This feature can be used, for example, to show regions of higher or lower density or return signal strength with a higher or lower luminance (as shown for example in image 1000), or with different hues (e.g., to highlight blood-like signals with a reddish hue and tissue-like signals with a bluish hue, as shown for example in image 1100).

In an exemplary embodiment, a clinician or other user is able to adjust brightness, contrast, gain, and color mapping with a single two-part control that seamlessly transitions between available visualization arrangements. However, the specific functions of different regions of the slider 1201 may be different than shown here. Other image control settings may be available instead of or in addition to those described above, and/or the ordering or positioning of the different control regions may be different than shown. Furthermore, the specific values invoked by different positions of the slider (e.g., different gain curve settings or color mappings) may be specific to a particular anatomical system of the body (e.g., peripheral arteries, coronary arteries, veins, heart chambers, etc.), to a particular catheter type (e.g., rotational, phased array, etc.), or to a particular operation (e.g., tissue evaluation, tissue ablation, stent placement, etc.), such that when a clinician or other user selects a particular anatomical system or procedure type for the intraluminal imaging system (e.g., system 100 of FIG. 1), the system can automatically select an appropriate image appearance control that includes such specialized or optimized features. In some cases, one or more virtual histology (VH) settings may be available. It is also possible to provide an extended configuration capability with multiple detailed controls. An example of detailed controls becoming available when a user for example double clicks an "Advanced Configuration" button or pictogram 1250. Such a detailed set of configuration controls (such as those shown for example in FIG. 5) may be recommended for advanced users, off-line activities like research and image optimization, pre-clinical studies, etc.

As shown in the embodiment of FIG. 12, each slider control 1220, 1240 can be used to select, modify, or alter a plurality of image settings. In some embodiments, moving a slider control within each sub-region controls only one image setting or parameter associated with that sub-region. By moving the slider from one sub-region to another sub-region, two or more image attributes are altered. For example, in response to adjusting the slider control 1220 in the contrast region 1215, the image settings can be adjusted to specific grayscale brightness, contrast, and/or gain setting values. In some embodiments, moving the slider control from a first position in the contrast region 1215 to a second position in the gain control region 1216 causes the system to select or determine both a gain setting value and a contrast setting value. For example, in response to moving the slider control 1220 from the first position to the second position, the system may select a default contrast setting value and a gain control setting value corresponding to the second position. In some embodiments, moving the slider control 1220 within a sub-region also modifies one or more settings corresponding to the other sub-regions. For example, in some embodiments, moving the slider control 1220 within the contrast region 1215 may also make adjustments to brightness values, and vice versa. In other embodiments, moving the slider control 1220, and/or the slider control 1240 within a single sub-region only affects the image settings corresponding to that sub-region.

In some embodiments, when moving the slider control 1220 from the brightness region 1214 to the sepia tone region 1212, a brightness value may be altered to a fixed or default value, and a sepia tone value may be altered to a new value. In some embodiments, one or more of the sub-regions are associated with two or more image setting values such that moving a slider control within a given sub-region (e.g., sepia tone region 1212) controls two or more image setting values, such as hue, tone, saturation, hue, brightness, contrast, or any other suitable image setting. In this regard, some of the regions or sub-regions of the control 1201 may be used to control a single image setting value, while other sub-regions are used to control multiple image setting values. In some embodiments, all of the sub-regions control two or more image setting values. In some embodiments, the slider controls 1220, 1240 are used in tandem to provide a set of image setting values for the image. For example, the first control 1220 may control brightness and contrast, while the second control 1240 controls image hue and/or saturation. Together, the image setting values associated with the positions of the slider controls 1220, 1240 are used to define the visual appearance of the image. In other embodiments, the visualization of the image depends on the image setting values associated with only one of the controls 1220, 1240. For example, by manipulating the first control 1220, the image is altered to either grayscale or sepia tone, and by manipulating the second control 1240, the image is colorized.

Having two separate slider controls 1220 and 1240 makes it possible, for example, to select a color palette or color mapping and also adjust the contrast within that color palette or color mapping, or other similar combinations of settings. As explained below, in some embodiments, a single slider control 1220 can be used to control grayscale settings such as brightness, contrast, and gain, in addition to the color mapping values, such as hue and saturation.

In some embodiments, the image setting values affect the manner in which the images appear on a screen. In this regard, in some embodiments, one or more of the image setting values affect image processing performed after the image data has already been acquired, as opposed to affecting the image acquisition. In other embodiments, one or more of the image settings may include or affect image acquisition settings, such as imaging transducer settings, imaging sequences for phased-array imaging devices, or any other suitable image acquisition setting. In some embodiments, an image setting may include or affect both image acquisition and image processing. In some embodiments, the control interface may include: (1) primary global setting sector that can change overall appearance, including hue/saturation, brightness and contrast, and/or (2) a secondary local setting sector that can change the display mapping differently within the image itself.

In some embodiments, the image setting values selected by the slider controls 1220 are applied to a static image. For example, a single IVUS image frame may be displayed. Manipulating one or both of the slider controls 1220, 1240, causes the processor to update the displayed image according to the altered image setting values. In some embodiments, the image setting values affect the appearance of a plurality of static images. For example, a plurality of images may be saved to a memory in communication with the processor. The image setting values selected for one image may be automatically applied to a sequential image recalled from the processor memory. In some embodiments, the image setting values are applied to a live, or continuously updating image stream. In some embodiments, changing the image setting values will cause the images acquired after the change or selection to be processed and displayed according to the altered image setting values.

Figure 13:
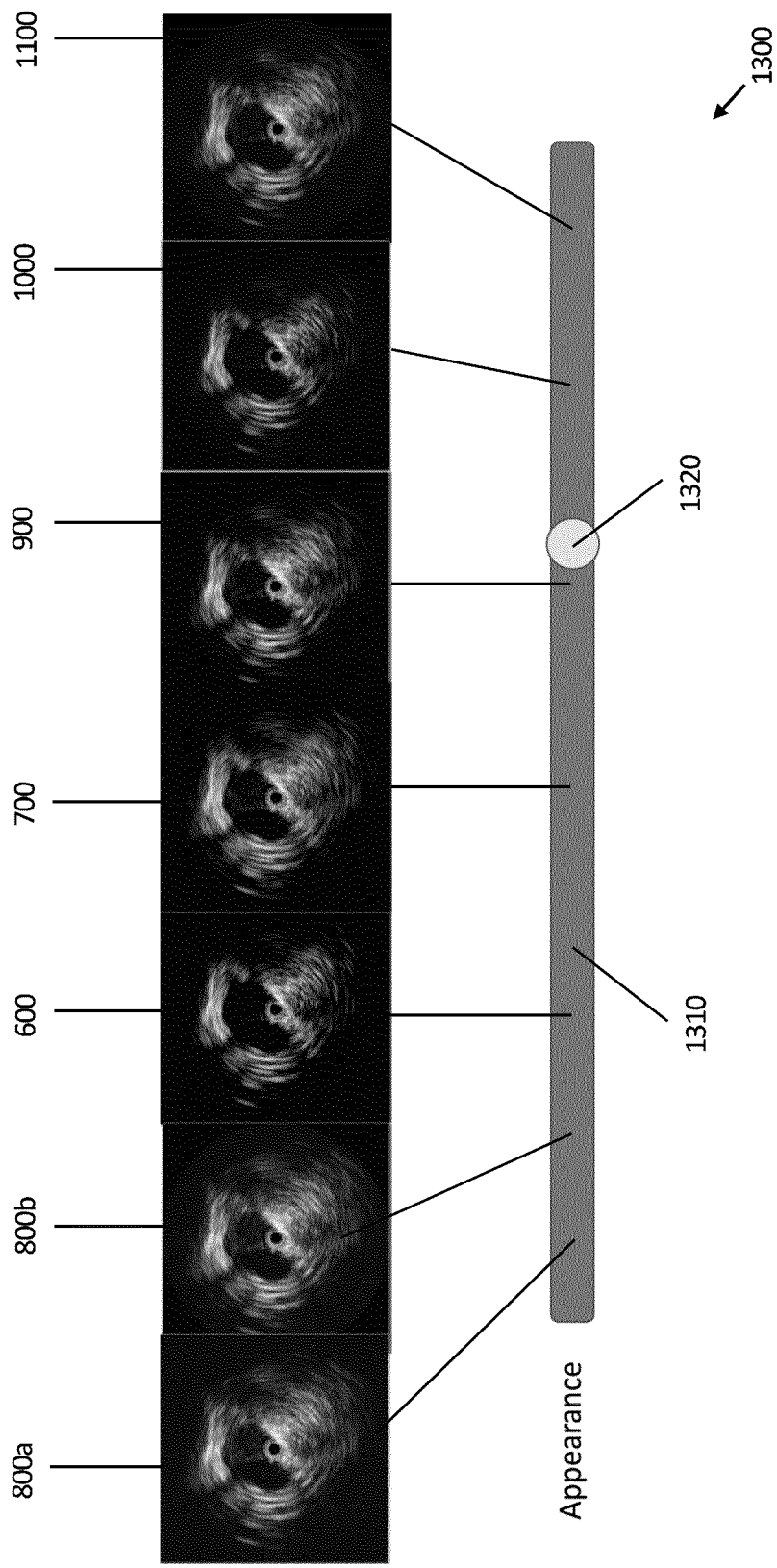
FIG. 13 is a diagrammatic representation of an example image appearance control, in accordance with at least one embodiment of the present disclosure.

FIG. 13 is a diagrammatic representation of an example image appearance control 1300, in accordance with at least one embodiment of the present disclosure. In this example, the image appearance control 1200 comprises a slider 1310 (e.g., a touchscreen slider) operated by a slider control 1320, that can include for example the same available settings as described above for FIG. 12 (resulting in the same example images 800a, 800b, 600, 700, 900, 1000, and 1100), or different available settings. In this non-limiting example, only a single slider control 1320 is available, and is capable of accessing all functions of the image appearance control 1300. Furthermore, the visual guide 1205 shown in FIG. 12 is absent in this example, and thus the image appearance control 1300 of FIG. 13 presents a cleaner, simpler interface than the image appearance control 1200 of FIG. 12. In some embodiments, the gradients and legend used for the interface of FIG. 12 can be used for the interface shown in FIG. 13, but with a single slider control. In some embodiments, a separate legend or instruction is shown on the interface to provide guidance on the image setting values associated with a given location on the slider 1310. As similarly explained above, in some embodiments, one or more of the segments or regions of the slider 1310 are associated with a single image setting such that moving the slider control 1320 within that sub-region controls only one image setting. In some embodiments, moving the slider control 1320 from one sub-region to a different sub-region causes the processor to alter or update two or more image setting values. In some embodiments, one or more of the segments or sub-regions of the slider 1310 is associated with two or more image setting values such that moving the slider control 1320 within that sub-region controls two or more image settings. In some embodiments, moving the single slider control 1320 from a grayscale region to a colorized region changes the image from a grayscale or sepia tone image to a colorized image.

Figure 14:
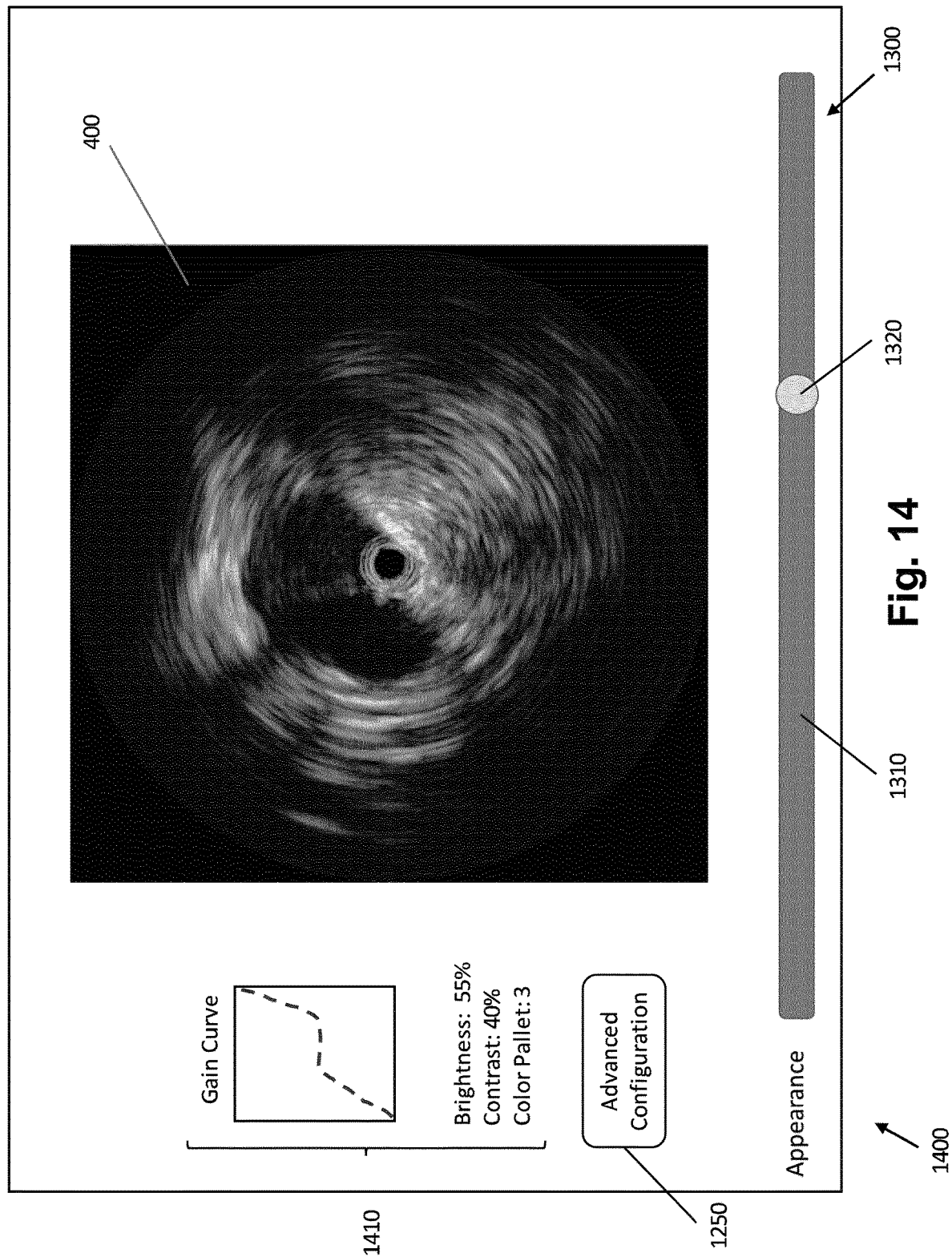
FIG. 14 shows an example screen display incorporating an image appearance control, in accordance with at least one embodiment of the present disclosure.

FIG. 14 shows an example screen display 1400 incorporating an image appearance control 1300, in accordance with at least one embodiment of the present disclosure. Visible are an IVUS image 400 and an image appearance control 1300, which comprises a slider 1310 and slider control 1320. Also visible are optional status indicators 1410 that show current values for particular image settings, and an optional Advanced Configuration button 1250 that may, for example, bring the user to a detailed configuration screen such as the screen 500 shown in FIG. 5. In some embodiments, other types of indicators are used instead of or in addition to the status indicators 1410, such as a circle, square, or other shape having the color corresponding to a hue selected using the slider 1320. While the gain setting is shown using a plot or graph, symbolic indicators, numerical values, or textual indicators may be used. Other features or arrangements may be included instead of or in addition to those shown here.

Figure 15:
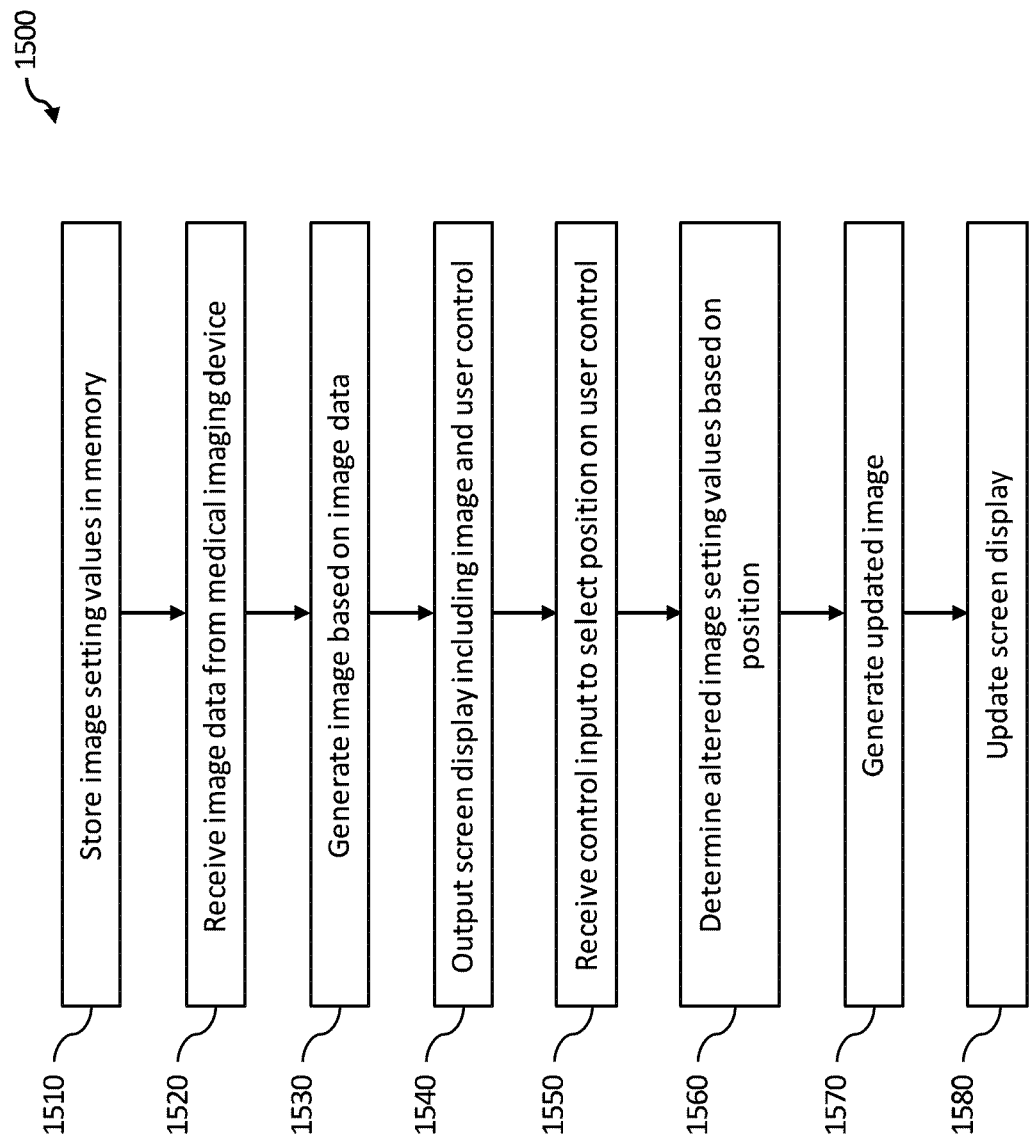
FIG. 15 illustrates a flow diagram for an example image appearance control method, in accordance with at least one embodiment of the present disclosure.

FIG. 15 illustrates a flow diagram for an example image appearance control method 1500, in accordance with at least one embodiment of the present disclosure. These steps may be executed for example as coded instructions on a processor such as processing system 106 of FIG. 1, and displayed for example on monitor 108 of FIG. 1, in response to inputs by a clinician or other user.

In step 1510, the intraluminal imaging system 100 stores image setting values in a memory. The image setting values may comprise coefficients, percentages, curves, or other numerical indicators associated with brightness, contrast, gain, hue, saturation, color temperature, sepia tone, or any other suitable image setting. In some embodiments, the image setting values may comprise default values associated with a default suite of imaging or display settings. In other embodiments, the image setting values may comprise a previously-used set of image setting values. In some embodiments, the image setting values are stored to the memory such that they are associated with respective positions on one or more user interface controls, such as a slider, as further described herein.

In step 1520, the intraluminal imaging system 100 receives image data from the medical imaging device, which is positioned with respect to a body of a patient. In some embodiments, the image data may comprise ultrasound image data from an IVUS imaging catheter, OCT image data from an OCT imaging catheter, external ultrasound data from an external ultrasound probe, or any other suitable medical imaging modality.

In step 1530, the intraluminal imaging system 100 generates an image based on the image data and image setting values stored in the memory. In some embodiments, generating the image includes generating the image based on a set of default image setting values stored in the memory. In other embodiments, the images are generated using the image setting values applied during a previous imaging procedure, such as the most recently used image setting values.

In step 1540, the method includes outputting a screen display that includes the image and a user control interface. The screen display may provide a graphical user interface (GUI) including one or more user interface objects to control the image acquisition settings and/or image display settings which will affect the appearance of the displayed image. As explained above, the control interface may include a slider with one or more slider controls or symbols that are movable to different positions along the slider. Each of the positions is associated with one or more image setting values. The slider may include multiple regions and/or sub-regions associated with one or more different image settings. However, other interface objects may be used instead of or in addition to the slider, such as a knob, a color palette, a dial, a fan of image presets, or any other suitable object.

In step 1550, the intraluminal imaging system 100 receives an input to select a position on the user control interface. In step 1560, based on the selected position, the intraluminal imaging system 100 determines image setting values based on the selected position. The image setting values determined in step 1560 may be referred to as altered image setting values. In this regard, in some embodiments, the image setting values determined in step 1560 may be different from the image setting values stored in the memory in step 1510. Referring to steps 1550 and 1560, each selected position on the user control interface may be representative of a plurality of different image setting values corresponding to a plurality of different image settings. In some embodiments, when the slider control is moved from one sub-region to another sub-region of the slider, a different image setting value is manipulated. In some embodiments, when the slider is moved from a first sub-region associated with a first image setting (e.g., brightness) to a second sub-region associated with a second image setting (e.g., contrast), the first setting value is altered back to a default value, and the second image setting value is changed based on the slider control's position.

In step 1570, an updated image is generated based on the altered image setting values. In step 1580, the screen display is updated to display the updated image. In some embodiments, the updated image replaces the previously displayed image. In some embodiments, the updated image is shown in addition to the previously displayed image.

A person or ordinary skill in the art will understand that for some embodiments, one or more of the above steps could be eliminated or performed in a different sequence, and that other steps may be added. For example, in some embodiments, the system operates in a fully autonomous mode, requiring no input from the user to cycle through available control positions and image settings. In some embodiments, multiple images may be displayed simultaneously, each controlled by its own image appearance control.

Figure 16:
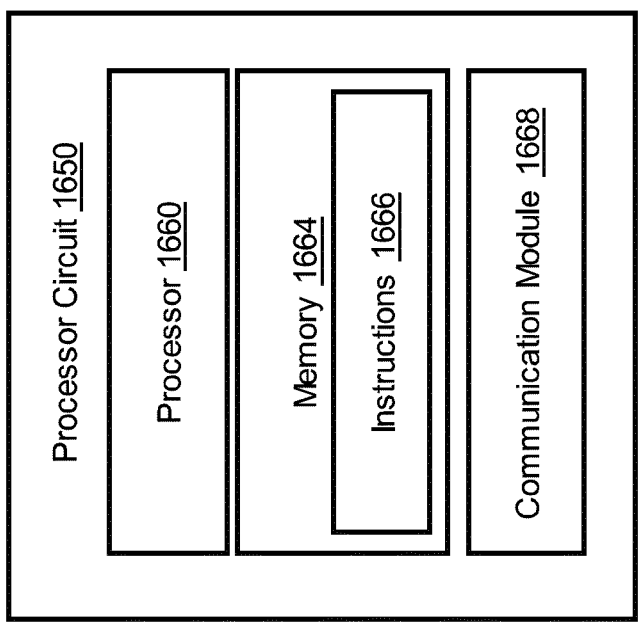
FIG. 16 is a schematic diagram of a processor circuit, according to embodiments of the present disclosure.

FIG. 16 is a schematic diagram of a processor circuit 1650, according to embodiments of the present disclosure. The processor circuit 1650 may be implemented in the ultrasound imaging system 100, or other devices or workstations (e.g., third-party workstations, network routers, etc.), or on a cloud processor or other remote processing unit, as necessary to implement the method. As shown, the processor circuit 1650 may include a processor 1660, a memory 1664, and a communication module 1668. These elements may be in direct or indirect communication with each other, for example via one or more buses.

The processor 1660 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1660 may also comprise another hardware device, a firmware device, or any combination thereof configured to perform the operations described herein. The processor 1660 may also be implemented as a combination of computing devices, e.g., a combination of a DSP and a microprocessor, a plurality of microprocessors, one or more microprocessors in conjunction with a DSP core, or any other such configuration.

The memory 1664 may include a cache memory (e.g., a cache memory of the processor 1660), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1064 includes a non-transitory computer-readable medium. The memory 1064 may store instructions 1666. The instructions 1666 may include instructions that, when executed by the processor 1660, cause the processor 1660 to perform the operations described herein. Instructions 1666 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 1668 can include any electronic circuitry and/or logic circuitry to facilitate direct or indirect communication of data between the processor circuit 1650, and other processors or devices. In that regard, the communication module 1668 can be an input/output (I/O) device. In some instances, the communication module 1668 facilitates direct or indirect communication between various elements of the processor circuit 1650 and/or the ultrasound imaging system 100. The communication module 1668 may communicate within the processor circuit 1650 through numerous methods or protocols. Serial communication protocols may include but are not limited to US SPI, I2C, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and central server, or readings from the ultrasound device) may be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

A number of variations are possible on the examples and embodiments described above. For example, the image appearance control may be employed in anatomical systems within the body other than those described, or may be employed to image other disease types, object types, or procedure types than those described. The technology described herein may be applied to intraluminal imaging sensors of diverse types, whether currently in existence or hereinafter developed. Any system and catheter combination that displays an image, including but not limited to optical imaging, IVUS imaging, and optical coherence tomography (OCT).

Accordingly, the logical operations making up the embodiments of the technology described herein are referred to variously as operations, steps, objects, elements, components, or modules. Furthermore, it should be understood that these may be performed in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the image appearance control. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the image appearance control as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. An intravascular imaging system, comprising:
a processor circuit configured for communication with an intravascular imaging catheter positioned inside a blood vessel of a patient, wherein the processor circuit is configured to:
receive intravascular image data from the intravascular imaging catheter;
output, to a display in communication with the processor circuit, a screen display comprising:
an intravascular image generated based on the image data and comprising a first visual appearance; and
a user control movable to a plurality of control positions, wherein the plurality of control positions comprises:
a first control position associated with the first visual appearance; and
a second control position associated with a second visual appearance,
wherein the user control is positioned at the first control position;
receive a control input moving the user control from the first control position to the second control position such that the control input is associated with simultaneously changing at least two image settings;
generate, in response to the user control being positioned at the second control position, an updated intravascular image based on the image data and comprising the second visual appearance; and
update the screen display to display the updated intravascular image.

2. The system of claim 1,
wherein the screen display comprises a slider,
wherein the slider comprises the plurality of control positions,
wherein the user control comprises a virtual knob moveable along a length of the slider.

3. The system of claim 2,
wherein the slider comprises a plurality of control position ranges,
wherein the plurality of control positions are located within the plurality of control position ranges,
wherein each control position range is specific to one image setting of the at least two image settings.

4. The system of claim 3,
wherein the screen display comprises a legend, and
wherein, for each of the plurality of control position ranges, the legend comprises a graphical representation of a corresponding image setting of the at least two image settings.

5. The system of claim 4, wherein the graphical representation comprises at least one of a grayscale gradient or a color gradient.

6. The system of claim 3,
wherein the at least two image settings comprise a first image setting and a second image setting,
wherein the plurality of control position ranges comprises a first control position range specific to the first image setting and a second control position range specific to the second image setting,
wherein the first control position is within the first control position range such that first values of the at least two image settings comprise:
a selected value of the first image setting corresponding to a position of the slider within the first control position range; and
a default value for the second image setting.

7. The system of claim 6,
wherein the second control position is within the second control position range such that second values of the at least two image settings comprise:
a default value for the first image setting; and
a selected value of the second image setting corresponding to a position of the slider within the second control position range.

8. The system of claim 7, wherein the control input is configured to simultaneously:
change the first image setting from the selected value corresponding to the position of the slider within the first control position range to the default value for the first image setting; and
change the second image setting from the default value for the second image setting to the selected value corresponding to the position of the slider within the second control position range.

9. The system of claim 2,
wherein the screen display comprises a second user control simultaneously as the user control is provided in the screen display,
wherein the second user control is associated with one or more image settings distinct from the at least two image settings.

10. The system of claim 9,
wherein the user control is configured to control a grayscale appearance,
wherein the second user control is configured to control a colorized appearance.

11. The system of claim 9,
wherein the second user control comprises a second virtual knob movable along the length of the slider,
wherein the virtual knob is provided on one side of the slider and the second virtual knob is provided on an opposite side of the slider.

12. The system of claim 1,
further comprising the intravascular imaging catheter,
wherein the intravascular imaging catheter is configured for intravascular ultrasound (IVUS) or optical coherence tomography (OCT).

13. The system of claim 1, wherein the at least two image settings comprise at least two of a brightness setting, a contrast setting, a gain setting, a hue setting, a saturation setting, a luminance setting, a color palette setting, or a dynamic range setting.

14. The system of claim 1,
wherein the first visual appearance comprises grayscale,
wherein the second visual appearance a color different than grayscale.

15. The system of claim 14, wherein the color different than grayscale comprises a relatively warmer color for an entirety of the updated intravascular image.

16. The system of claim 15, wherein the relatively warmer color comprises at least one of yellow, orange, or sepia.

17. The system of claim 14, wherein the color different than grayscale comprises a relatively cooler color for an entirety of the updated intravascular image.

18. The system of claim 17, wherein the relatively cooler color comprises at least one of blue or violet.

19. The system of claim 14, wherein tissue within the updated intravascular image comprises the color different than grayscale.

20. An intravascular imaging method, comprising:
receiving, by a processor circuit, intravascular image data from an intravascular imaging catheter positioned inside a blood vessel of a patient;
outputting, by the processor circuit, to a display, a screen display comprising:
an intravascular image generated based on the intravascular image data and comprising a first visual appearance; and
a user control movable to a plurality of control positions, wherein the plurality of control positions comprises:
a first control position associated with the first visual appearance; and
a second control position associated with a second visual appearance,
wherein the user control is positioned at the first control position;
receiving, by the processor circuit, a control input moving the user control from the first control position to the second control position such that the control input is associated with simultaneously changing at least two image settings;
generating, by the processor circuit and in response to the user control being positioned at the second control position, an updated intravascular image based on the intravascular image and comprising the second visual appearance; and
updating, by the processor circuit, the screen display to display the updated intravascular image.

* * * * *